US009425939B2

(12) United States Patent
Park et al.

(10) Patent No.: US 9,425,939 B2
(45) Date of Patent: Aug. 23, 2016

(54) METHODS AND APPARATUSES FOR RECEIVING OR TRANSMITTING DOWNLINK SIGNAL IN MBSFN SUBFRAME

(71) Applicant: LG ELECTRONICS INC., Seoul (KR)

(72) Inventors: Hanjun Park, Anyang-si (KR); Hanbyul Seo, Anyang-si (KR); Jonghyun Park, Anyang-si (KR); Kijun Kim, Anyang-si (KR); Seungmin Lee, Anyang-si (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 14/373,328

(22) PCT Filed: Feb. 22, 2013

(86) PCT No.: PCT/KR2013/001431
§ 371 (c)(1),
(2) Date: Jul. 18, 2014

(87) PCT Pub. No.: WO2013/125897
PCT Pub. Date: Aug. 29, 2013

(65) Prior Publication Data
US 2015/0009925 A1    Jan. 8, 2015

Related U.S. Application Data

(60) Provisional application No. 61/602,572, filed on Feb. 23, 2012.

(51) Int. Cl.
*H04W 4/00* (2009.01)
*H04L 5/00* (2006.01)
*H04L 27/26* (2006.01)

(52) U.S. Cl.
CPC .............. *H04L 5/0051* (2013.01); *H04L 5/005* (2013.01); *H04L 5/0094* (2013.01); *H04L 27/2602* (2013.01); *H04L 5/0007* (2013.01)

(58) Field of Classification Search
CPC . H04W 24/10; H04W 84/045; H04W 72/082; H04L 25/0202; H04L 27/2636
See application file for complete search history.

(56) References Cited

U.S. PATENT DOCUMENTS

| 8,670,386 B2 * | 3/2014 | Bai ....................... H04L 5/0007 370/310.2 |
| 8,811,510 B2 * | 8/2014 | Zhuang et al. ................ 375/267 |

(Continued)

OTHER PUBLICATIONS

PCT International Application No. PCT/KR2013/001431, Written Opinion of the International Searching Authority dated Jun. 26, 2013, 11 pages.

(Continued)

*Primary Examiner* — Mounir Moutaouakil
(74) *Attorney, Agent, or Firm* — Lee, Hong, Degerman, Kang & Walmey; Jonathan Kang; Michael Monaco

(57) ABSTRACT

According to an aspect of the present invention, a method for receiving a downlink signal from a base station (BS) in a multicast broadcast single frequency network (MBSFN) subframe which performed by a user equipment (UE) includes receiving information indicating an MBSFN subframe of which a data region is allocated a cell-specific reference signal (CRS), among MBSFN subframes, and demodulating the downlink signal received in the data region of the MBSFN subframe based on the CRS in the data region of the MBSFN subframe according to the information.

12 Claims, 12 Drawing Sheets

(56) References Cited

U.S. PATENT DOCUMENTS

| | | | |
|---|---|---|---|
| 9,131,351 B2* | 9/2015 | Malladi | H04W 4/06 |
| 2011/0085618 A1* | 4/2011 | Zhuang et al. | 375/296 |
| 2011/0103286 A1 | 5/2011 | Montojo et al. | |
| 2011/0116437 A1* | 5/2011 | Chen et al. | 370/312 |
| 2011/0275394 A1* | 11/2011 | Song et al. | 455/509 |
| 2011/0299449 A1 | 12/2011 | Kwon et al. | |
| 2011/0310830 A1* | 12/2011 | Wu et al. | 370/329 |
| 2011/0319025 A1 | 12/2011 | Siomina et al. | |
| 2012/0027110 A1 | 2/2012 | Han et al. | |
| 2012/0033595 A1* | 2/2012 | Aoyama et al. | 370/311 |
| 2012/0039405 A1* | 2/2012 | Zheng | H04L 5/0048 375/260 |
| 2012/0044872 A1* | 2/2012 | Aydin et al. | 370/328 |
| 2012/0115469 A1* | 5/2012 | Chen et al. | 455/434 |
| 2012/0213107 A1* | 8/2012 | Jang et al. | 370/252 |
| 2012/0213137 A1* | 8/2012 | Jeong et al. | 370/311 |
| 2012/0275322 A1* | 11/2012 | Ji et al. | 370/252 |
| 2012/0307922 A1* | 12/2012 | Simonsson et al. | 375/260 |
| 2012/0327821 A1* | 12/2012 | Lin et al. | 370/280 |
| 2013/0003578 A1* | 1/2013 | Hu et al. | 370/252 |
| 2013/0017793 A1* | 1/2013 | Henttonen et al. | 455/63.1 |
| 2013/0028149 A1* | 1/2013 | Chen et al. | 370/280 |
| 2013/0028161 A1* | 1/2013 | Maeda et al. | 370/311 |
| 2013/0029657 A1* | 1/2013 | Gao et al. | 455/422.1 |
| 2013/0039338 A1* | 2/2013 | Suzuki et al. | 370/331 |
| 2013/0045740 A1* | 2/2013 | Gayde et al. | 455/436 |
| 2013/0045770 A1* | 2/2013 | Aschan et al. | 455/522 |
| 2013/0058234 A1* | 3/2013 | Yang et al. | 370/252 |
| 2013/0229971 A1* | 9/2013 | Siomina et al. | 370/312 |
| 2013/0286883 A1* | 10/2013 | Kim et al. | 370/252 |
| 2013/0315092 A1* | 11/2013 | Yu et al. | 370/252 |
| 2014/0112254 A1* | 4/2014 | Lindoff et al. | 370/328 |
| 2014/0119334 A1* | 5/2014 | Kazmi et al. | 370/330 |
| 2014/0313923 A1* | 10/2014 | Yang et al. | 370/252 |

OTHER PUBLICATIONS

PCT International Application No. PCT/KR2013/001431, Written Opinion of the International Searching Authority dated Jun. 26, 2013, 1 page.

* cited by examiner

METHODS AND APPARATUSES FOR RECEIVING OR TRANSMITTING DOWNLINK SIGNAL IN MBSFN SUBFRAME

CROSS-REFERENCE TO RELATED APPLICATIONS

This application is the National Stage filing under 35 U.S.C. 371 of International Application No. PCT/KR2013/001431, filed on Feb. 22, 2013, which claims the benefit of U.S. Provisional Application Ser. No. 61/602,572, filed on Feb. 23, 2012, the contents of which are hereby incorporated by reference herein in their entirety.

TECHNICAL FIELD

The present invention is related to methods and apparatuses for receiving or transmitting a downlink signal in a wireless communication system, more specifically, methods and apparatuses for receiving or transmitting a downlink signal in a multicast broadcast single frequency network (MBSFN) subframe.

BACKGROUND ART

In a wireless communication system such as 3GPP LTE, an LTE multimedia broadcast/multicast service (MBMS) is defined to efficiently provide broadcast and multicast services. The LTE MBMS applies a radio interface for transmitting broadcast and multicast data in a structure in which multiple cells operate like a single synchronized frequency network, i.e. in an MBSFN subframe. Meanwhile, MBSFN data is transmitted in correspondence to a physical multicast channel (PMCH) in terms of a physical layer. The PMCH recognizes an effective channel of a form in which channels of multiple cells are combined. Accordingly, an additional MBSFN reference signal (RS) for estimating the effective channel is transmitted through the PMCH.

In this case, presence of the PMCH and a PDSCH in the frequency domain in a specific subframe burdens a user equipment (UE) with simultaneous estimation of a cell-specific RS (CRS) based channel and an MBSFN RS based channel. To solve such a problem, the LTE system restricts transmission of the PDSCH in a subframe in which the PMCH is transmitted, referred to as an MBSFN subframe. Hence, the MBSFN subframe includes a downlink control region in a first or second OFDM symbol and the other region, i.e. the PMCH. While CRSs are transmitted in the control region, no CRSs are transmitted in the PMCH.

MBSFM subframes are semi-statically allocated according to a system information block (SIB) type 2 which is system information transmitted from higher layers. The system information may be updated at intervals of about twice or three times per hour. Accordingly, a transmission pattern of the MBSFM subframes may continue for a considerable time period. However, data for the MBMS is not always transmitted and partial resources among the allocated MBSFN subframes may not be used for the MBMS.

In LTE-A, a method for utilizing unused MBSFN subframes has been discussed and a method for transmitting unicast data for LTE-A UEs through the MBSFM subframe is proposed in consideration of the fact that legacy LTE UEs cannot expect that the unicast data will be transmitted in the MBSFM subframe.

DISCLOSURE OF INVENTION

Technical Problem

An object of the present invention is to provide a method for improving demodulation performance of unicast data during transmission and reception of an MBSFN subframe in which the unicast data is transmitted.

Another object of the present invention is to provide a method for supporting demodulation of a legacy UE as well as a UE of an embodiment of the present invention.

It will be appreciated by persons skilled in the art that that the technical objects that can be achieved through the present invention are not limited to what has been particularly described hereinabove and other technical objects of the present invention will be more clearly understood from the following detailed description.

Solution to Problem

According to an aspect of the present invention, a method for receiving a downlink signal from a base station (BS) in a multicast broadcast single frequency network (MBSFN) subframe which performed by a user equipment (UE) includes receiving information indicating an MBSFN subframe of which a data region is allocated a cell-specific reference signal (CRS), among MBSFN subframes, and demodulating the downlink signal received in the data region of the MBSFN subframe based on the CRS in the data region of the MBSFN subframe according to the information.

Preferably, the CRS transmitted in the data region of the indicated MBSFN subframe may be allocated to a partial region of the data region of the indicted MBSFN subframe.

Preferably, the UE may assume that a downlink signal is not allocated in the other region of the data region of the indicated MBSFN subframe.

Preferably, the method may further include receiving a UE-specific reference signal in the other region of the data region of the indicated MBSFN subframe, wherein the UE-specific reference signal is used for demodulating the downlink signal.

Preferably, the method may further include receiving at least one of resource configuration information and transmission power information of the CRS transmitted in the data region of the indicated MBSFN subframe.

Preferably, the CRS allocated in the data region of the indicated MBSFN subframe may be transmitted at a reduced transmission power compared with a transmission power of a normal CRS.

Preferably, the MBSFN subframes may be configured as almost blank subframes (ABSs) of which a data region is allocated a reduced transmission power lower than a transmission power in a data region of a normal subframe.

Preferably, the information indicating the MBSFN subframe may be received from the BS through higher layer signaling.

According to another aspect of the present invention, a method for a base station (BS) to transmit a downlink signal to a user equipment (UE) in a multicast broadcast single frequency network (MBSFN) subframe includes transmitting, to the UE, information indicating an MBSFN subframe of which a data region is allocated a cell-specific reference signal (CRS), among MBSFN subframes, wherein the information indicates that the UE demodulate the downlink signal received in the data region of the MBSFN subframe, based on the CRS in the data region of the MBSFN subframe.

Preferably, the CRS transmitted in the data region of the indicated MBSFN subframe may be allocated to a partial region of the data region of the indicated MBSFN subframe.

According to still another aspect of the present invention, a user equipment (UE) for receiving a downlink signal from a base station (BS) in a multicast broadcast single frequency network (MBSFN) subframe includes a radio frequency (RF) unit for transmitting or receiving an RF signal and a processor for controlling the RF unit, wherein the processor receives, through the RF unit, information indicating an MBSFN subframe of which a data region is allocated a cell-specific reference signal (CRS), among MBSFN subframes and demodulates the downlink signal received in the data region of the MBSFN subframe based on the CRS in the data region of the MBSFN subframe, according to the information.

Preferably, the CRS transmitted in the data region of the indicated MBSFN subframe may be allocated to a partial region of the data region of the indicted MBSFN subframe.

Preferably, the UE may assume that a downlink signal therefor is not allocated in the other region of the data region of the indicated MBSFN subframe.

Preferably, the processor may receive a UE-specific reference signal in the other region of the data region of the indicated MBSFN subframe through the RF unit and the UE-specific reference signal is used for demodulating the downlink signal.

Preferably, the processor may receive at least one of resource configuration information and transmission power information of the CRS transmitted in the data region of the indicated MBSFN subframe through the RF unit.

Preferably, the CRS allocated in the data region of the indicated MBSFN subframe may be transmitted at a reduced transmission power compared with a transmission power of a normal CRS.

The MBSFN subframes may be configured as almost blank subframes (ABSs) of which a data region is allocated a reduced transmission power lower than a transmission power in a data region of a normal subframe.

The information indicating the MBSFN subframe may be received from the BS through higher layer signaling.

According to a further aspect of the present invention, a base station (BS) for transmitting a downlink signal to a user equipment (UE) in a multicast broadcast single frequency network (MBSFN) subframe include a radio frequency (RF) unit for transmitting or receiving an RF signal and a processor for controlling the RF unit, wherein the processor transmits, through the RF unit to the UE, information indicating an MBSFN subframe of which a data region is allocated a cell-specific reference signal (CRS), among MBSFN subframes, and wherein the information indicates that the UE demodulate the downlink signal received in the data region of the MBSFN subframe, based on the CRS in the data region of the MBSFN subframe.

Preferably, the CRS transmitted in the data region of the indicated MBSFN subframe may be allocated to a partial region of the data region of the indicted MBSFN subframe.

The above aspects of the present invention are merely some parts of the exemplary embodiments of the present invention and other embodiments into which the technical features of the present invention are incorporated can be derived and understood by those skilled in the art from the detailed description of the present invention which follows.

ADVANTAGEOUS EFFECTS OF INVENTION

According to the present invention, demodulation performance of unicast data transmitted through an MBSFN subframe can be improved.

According to the present invention, demodulation of a legacy UE as well as a UE of an embodiment of the present invention can be supported.

It will be appreciated by persons skilled in the art that that the effects that can be achieved through the present invention are not limited to what has been particularly described hereinabove and other advantages of the present invention will be more clearly understood from the following detailed description.

BRIEF DESCRIPTION OF DRAWINGS

The accompanying drawings, which are included to provide a further understanding of the invention and are incorporated in and constitute a part of this application, illustrate embodiment(s) of the invention and together with the description serve to explain the principle of the invention. In the drawings.

MODE FOR THE INVENTION

Figure 1:
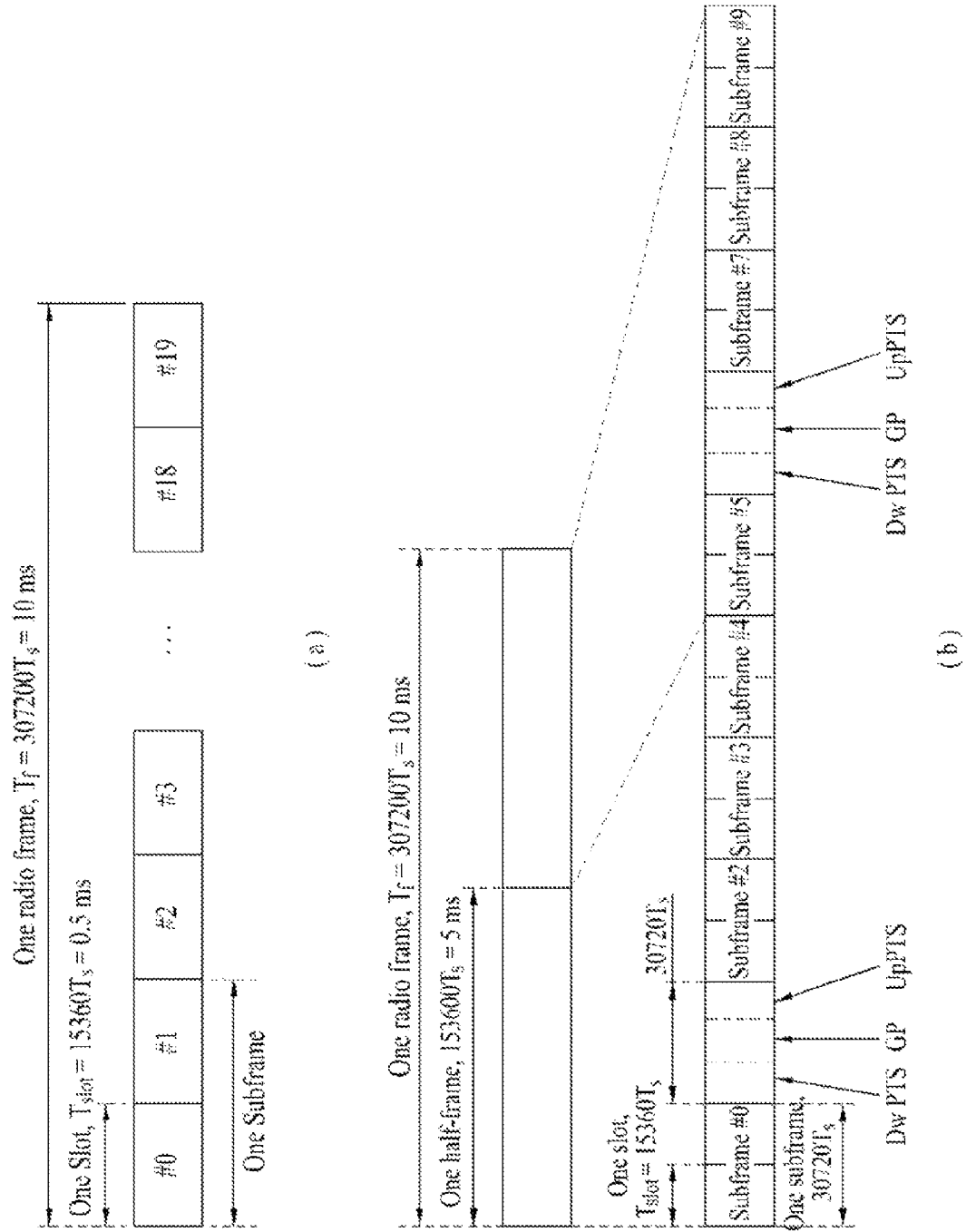
FIG. 1 is a diagram showing an example of a radio frame structure used in a wireless communication system.

Reference will now be made in detail to the preferred embodiments of the present invention, examples of which are illustrated in the accompanying drawings. The detailed description set forth below in connection with the appended drawings is intended as a description of exemplary embodiments and is not intended to represent the only embodiments in which the concepts explained in these embodiments can be practiced. The detailed description includes details for the purpose of providing an understanding of the present invention. However, it will be apparent to those skilled in the art that these teachings may be implemented and practiced without these specific details.

The following technique, apparatus and system is applicable to various wireless multiple access systems. For convenience of description, assume that the present invention is applied to 3GPP LTE(-A). However, the technical features of the present invention are not limited thereto. For example, although the following detailed description is made in detail on the assumption that a mobile communication system is a 3GPP LTE(-A) system, it is applicable to other prescribed mobile communication systems by excluding unique items of the 3GPP LTE(-A) system.

In some instances, well-known structures and devices are omitted in order to avoid obscuring the concepts of the present invention and the important functions of the structures and devices are shown in block diagram form. The same reference numbers will be used throughout the drawings to refer to the same or like parts.

In the present invention, a user equipment (UE) may be fixed or mobile and include various apparatuses which communicate with a base station (BS) and transmit and receive user data and/or a variety of control information. The UE may be referred to as a terminal Equipment, a mobile station (MS), a mobile terminal (MT), a user terminal (UT), a subscriber station (SS), a wireless device, a personal digital assistant (PDA), a wireless modem, a handheld device, etc. In the present invention, a base station (BS) refers to a fixed station which communicates with a UE and/or another BS and exchanges a variety of data and control information. The BS is referred to as an advanced base station (ABS), a node-B (NB), an evolved-NodeB (eNB), a base transceiver system (BTS), an access point (AP), a processing server (PS), etc.

In the present invention, a PDCCH (Physical Downlink Control CHannel)/PCFICH (Physical Control Format Indicator CHannel)/PHICH (Physical Hybrid automatic retransmit request Indicator CHannel)/PDSCH (Physical Downlink Shared CHannel) refers to a set of resource elements or a set of time-frequency resources carrying DCI (Downlink Control Information)/CFI (Control Format Indicator)/downlink ACK/NACK (ACKnowlegement/Negative ACK)/downlink data. In addition, a PUCCH (Physical Uplink Control CHannel)/PUSCH (Physical Uplink Shared CHannel) refers to a set of resource elements or a set of time-frequency resources carrying UCI (Uplink Control Information)/uplink data. In the present invention, in particular, time-frequency resources or resource elements (REs) allocated to or belonging to PDCCH/PCFICH/PHICH/PDSCH/PUCCH/PUSCH are referred to as PDCCH/PCFICH/PHICH/PDSCH/PUCCH/PUSCH REs or PDCCH/PCFICH/PHICH/PDSCH/PUCCH/PUSCH resources. Accordingly, in the present invention, transmission of a PUCCH/PUSCH by a UE means that an uplink control information/uplink data/random access signal is transmitted on a PUCCH/PUSCH. In the present invention, transmission of a PDCCH/PCFICH/PHICH/PDSCH by a BS means that downlink data/control information is transmitted on a PDCCH/PCFICH/PHICH/PDSCH.

In addition, in the present invention, a CRS (Cell-specific Reference Signal)/DMRS (Demodulation Reference Signal)/CSI-RS (Channel State Information Reference Signal) time-frequency resources (or REs) refer to time-frequency resources (or REs) carrying CRS/DMRS/CSI-RS, REs allocated to CRS/DMRS/CSI-RS or available REs. A subcarrier including a CRS/DMRS/CSI-RS RE is referred to as a CRS/DMRS/CSI-RS subcarrier and an OFDM symbol including a CRS/DMRS/CSI-RS RE is referred to as a CRS/DMRS/CSI-RS symbol. In addition, in the present invention, SRS time-frequency resources (or REs) refer to time-frequency resources (or REs) transmitted from a UE to a BS to carry a sounding reference signal (SRS) used for measurement of an uplink channel state formed between the UE and the BS. A reference signal (RS) refers to a predefined signal known to a UE and a BS and having a special waveform and is referred to as a pilot signal.

Meanwhile, in the present invention, a cell refers to a predetermined geographical region in which a BS, node(s) or antenna port(s) provide a communication service. Accordingly, in the present invention, communication with a specific cell may refer to communication with a BS, node or antenna port for providing a communication service to the specific cell. In addition, a downlink/uplink signal of a specific cell refers to a downlink/uplink signal from/to a BS, node or antenna port for providing a communication service to the specific cell. In addition, channel state/quality of a specific cell refers to channel state/quality of a channel or communication link formed between a UE and a BS, node or antenna port for providing a communication service to the specific cell.

FIG. 1 is a diagram showing the structure of a radio frame used in a wireless communication system. In particular, FIG. 1(a) shows a radio frame structure used in frequency division duplex (FDD) in 3GPP LTE(-A) and FIG. 1(b) shows a radio frame structure used in time division duplex (TDD) in 3GPP LTE(-A).

Referring to FIG. 1, a radio frame used in 3GPP LTE(-A) has a length of 10 ms (307200?Ts) and includes 10 subframes with the same size. The 10 subframes of the radio frame may be numbered. Ts denotes sampling time, and is represented by Ts=1/(2048*15 kHz). Each of the subframes has a length of 1 ms and includes two slots. The 20 slots of one radio frame may be sequentially numbered from 0 to 19. Each of the slots has a length of 0.5 ms. A time for transmitting one subframe is defined as a transmission time interval (TTI). Time resources may be divided by a radio frame number (or a radio frame index), a subframe number (or a subframe index), a slot number (or a slot index), etc.

The radio frame may be differently configured according to duplex mode. For example, in an FDD mode, since downlink (DL) transmission and uplink (UL) transmission are divided according to frequency, a radio frame includes only one of a DL subframe or a UL subframe in a predetermined frequency band of a predetermined carrier frequency. In a TDD mode, since downlink (DL) transmission and uplink (UL) transmission are divided according to time, a radio frame includes both a DL subframe and a UL subframe in a predetermined frequency band of a predetermined carrier frequency.

Table 1 shows a DL-UL configuration of subframes within a radio frame, in a TDD mode.

TABLE 1

| DL-UL configuration | Downlink-to-Uplink Switch-point periodicity | Subframe number | | | | | | | | | |
|---|---|---|---|---|---|---|---|---|---|---|---|
| | | 0 | 1 | 2 | 3 | 4 | 5 | 6 | 7 | 8 | 9 |
| 0 | 5 ms | D | S | U | U | U | D | S | U | U | U |
| 1 | 5 ms | D | S | U | U | D | D | S | U | U | D |
| 2 | 5 ms | D | S | U | D | D | D | S | U | D | D |
| 3 | 10 ms | D | S | U | U | U | D | D | D | D | D |
| 4 | 10 ms | D | S | U | U | D | D | D | D | D | D |
| 5 | 10 ms | D | S | U | D | D | D | D | D | D | D |
| 6 | 5 ms | D | S | U | U | U | D | S | U | U | D |

In Table 1, D denotes a DL subframe, U denotes a UL subframe and S denotes a special subframe. The special subframe includes three fields of DwPTS (Downlink Pilot TimeSlot), GP (Guard Period) and UpPTS (Uplink Pilot TimeSlot). DwPTS is a time slot reserved for DL transmission and UpPTS is a time slot reserved for UL transmission.

Figure 2:
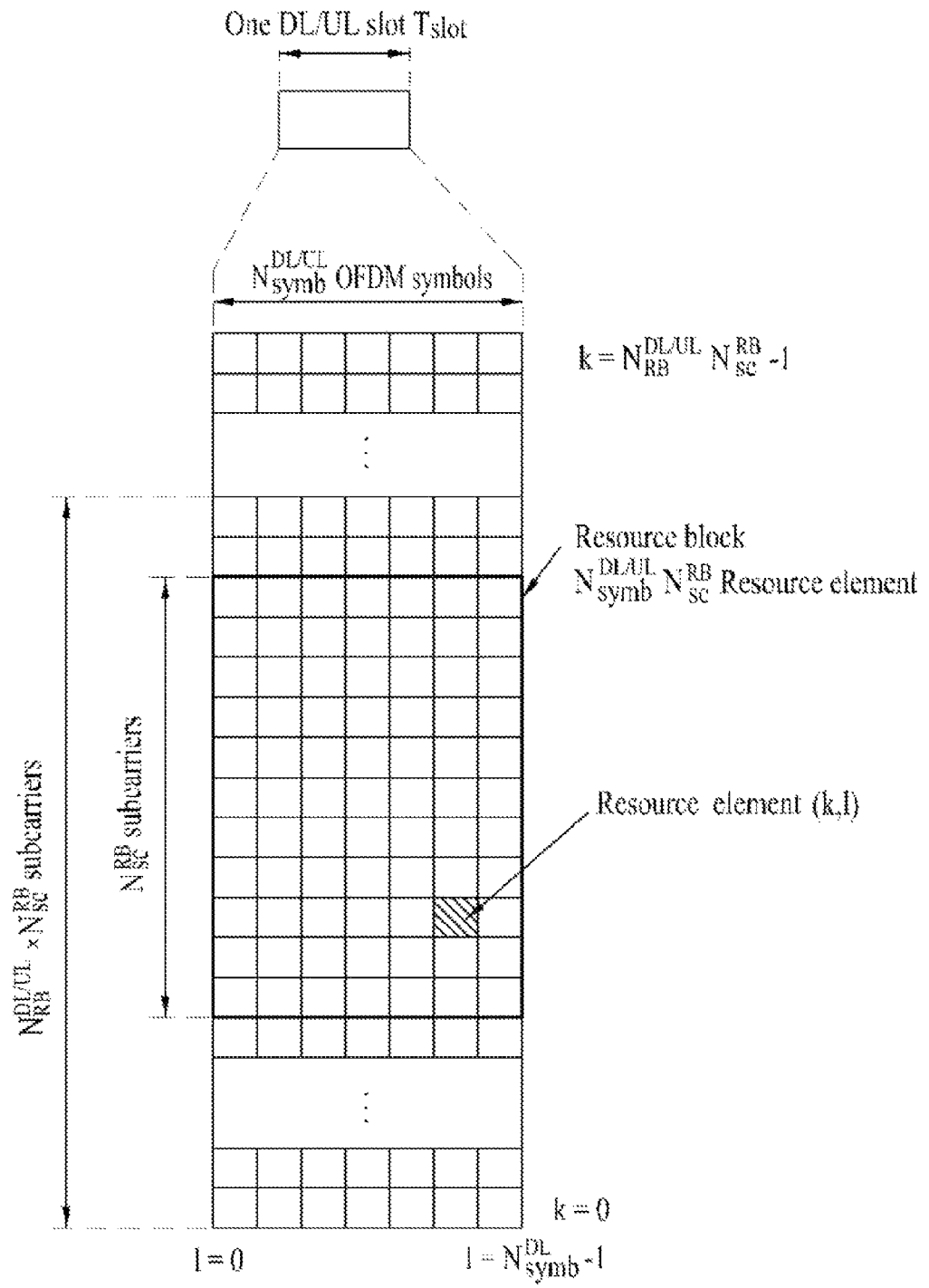
FIG. 2 is a diagram showing an example of a downlink/uplink (DL/UL) slot structure in a wireless communication system.

FIG. 2 is a diagram showing an example of a downlink/uplink (DL/UL) slot structure in a wireless communication system. In particular, FIG. 2 shows the structure of a resource grid of a 3GPP LTE(-A) system. One resource grid exists per antenna port.

A slot includes a plurality of orthogonal frequency division multiplexing (OFDM) symbols in a time domain and includes a plurality of resource blocks (RBs) in a frequency domain. The OFDM symbol means one symbol slot. Referring to FIG. 2, a signal transmitted in each slot may be expressed by a resource grid including $N^{DL/UL}_{RB} * N^{RB}_{sc}$ subcarriers and $N^{DL/UL}_{symb}$ OFDM symbols. $N^{DL}_{RB}$ denotes the number of resource blocks (RBs) in a DL slot and $N^{UL}_{RB}$ denotes the number of RBs in a UL slot. $N^{DL}_{RB\,and\,N}{}^{UL}_{RB}$ depend on a DL transmission bandwidth and a UL transmission bandwidth. $N^{DL}_{symb}$ denotes the number of OFDM symbols in a DL slot, $N^{UL}_{symb}$ denotes the number of OFDM symbols in a UL slot, and $N^{RB}_{sc}$ denotes the number of sub-carriers configuring one RB.

An OFDM symbol may be referred to as an OFDM symbol, an SC-FDM symbol, etc. according to multiple access scheme. The number of OFDM symbols included in one slot may be variously changed according to channel bandwidth and CP length. For example, in a normal cyclic prefix (CP) case, one slot includes seven OFDM symbols. In an extended CP case, one slot includes six OFDM symbols. Although one slot of a subframe including seven OFDM symbols is shown in FIG. 2 for convenience of description, the embodiments of the present invention are similarly applicable to subframes having a different number of OFDM symbols. Referring to FIG. 2, each OFDM symbol includes $N^{DL/UL}_{RB} * N^{RB}_{sc}$ sub-carriers in a frequency domain. The type of the subcarrier may be divided into a data subcarrier for data transmission, a reference signal subcarrier for reference signal transmission and a null subcarrier for a guard band and a DC component. The null subcarrier for the DC component is unused and is mapped to a carrier frequency $f_0$ in a process of generating an OFDM signal or in a frequency up-conversion process. The carrier frequency is also called a center frequency.

One RB is defined as $N^{DL/UL}_{symb}$ (e.g., 7) consecutive OFDM symbols in a time domain and defined as $N^{RB}_{sc}$ (e.g., 12) consecutive subcarriers in a frequency domain. For reference, resource including one OFDM symbol and one subcarrier is referred to a resource element (RE) or tone. Accordingly, one RB includes $N^{DL/UL}_{symb} * N^{Rb}_{sc}$ REs. Each RE within a resource grid may be uniquely defined by an index pair (k, l) within one slot. k is an index applied from 0 to $N^{DL/UL}_{RB} * N^{RB}_{sc} - 1$ in a frequency domain, and l is an index from 0 to $N^{DL/UL}_{symb} - 1$ in a time domain.

In one subframe, two RBs respectively located in two slots of the subframe while occupying the same $N^{RB}_{sc}$ consecutive subcarriers is referred to as a physical resource block (PRB) pair. Two RBs configuring a PRB pair have the same PRB number (or the same PRB index). A VRB is a logical resource allocation unit introduced for resource allocation. The VRB has the same size as the PRB. The VRB is classified into a localized VRB and a distributed VRB according to the method of mapping the PRB to the VRB. Localized VRBs are directly mapped to PRBs and thus VRB number (VRB index) directly corresponds to PRB number. That is, $n_{PRB}=n_{VRB}$. The localized VRBs are numbered from 0 to $N^{DL}_{VRB}-1$ and $N^{DL}_{VRB}=N^{DL}_{RB}$. Accordingly, according to the localized mapping method, VRBs having the same VRB number are mapped to RRBs having the same PRB number in a first slot and a second slot. In contrast, the distributed VRB is mapped to the PRB through interleaving. Accordingly, the distributed VRBs having the same VRB number may be mapped to RRBs having different PRB numbers in a first slot and a second slot. Two PRBs which are respectively located in two slots of a subframe and have the same VRB number are referred to as a VRB pair.

Figure 3:
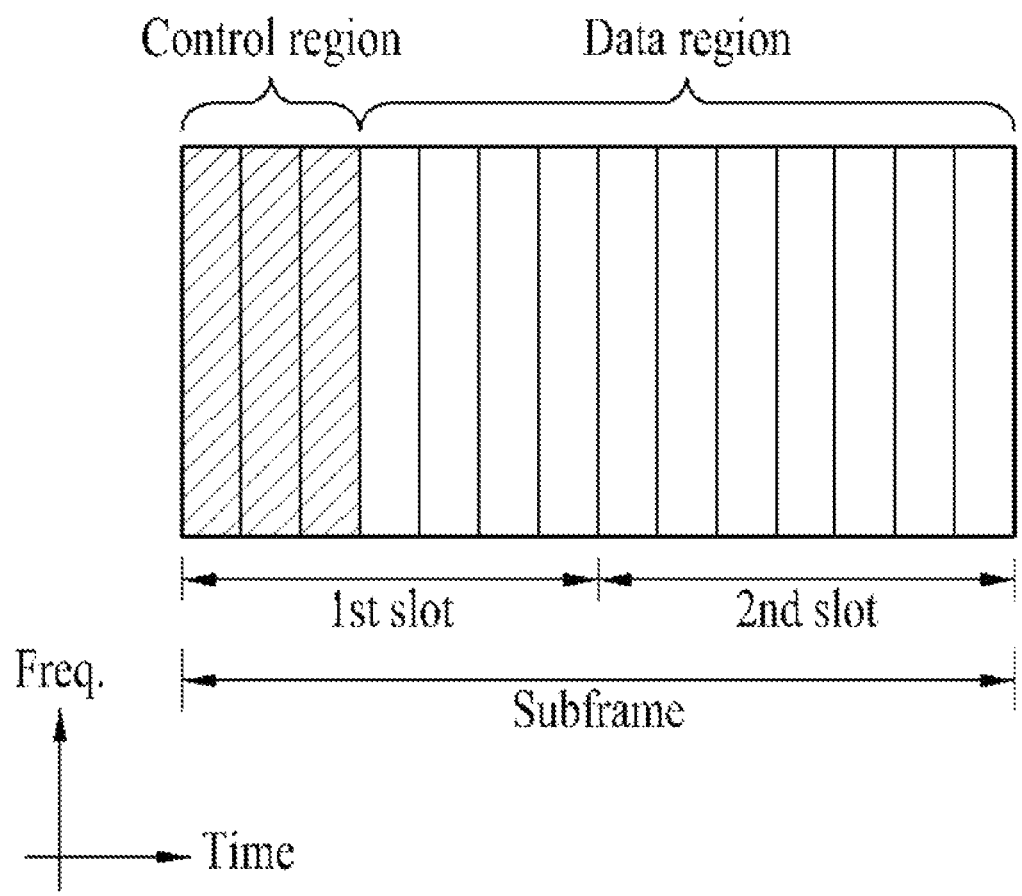
FIG. 3 is a diagram showing a downlink subframe structure used in a 3GPP LTE(-A) system.

FIG. 3 is a diagram showing a downlink subframe structure used in a 3GPP LTE(-A) system.

A DL subframe is divided into a control region and a data region in a time domain. Referring to FIG. 3, a maximum of 3 (or 4) OFDM symbols located in a front part of a first slot of a subframe correspond to the control region. Hereinafter, a resource region for PDCCH transmission in a DL subframe is referred to as a PDCCH region. OFDM symbols other than the OFDM symbols used in the control region correspond to the data region to which a physical downlink shared channel (PDSCH) is allocated. Hereinafter, a resource region available for PDSCH transmission in a DL subframe is referred to as a PDSCH region. Examples of a DL control channel used in 3GPP LTE include PCFICH (Physical Control Format Indicator Channel), PDCCH (Physical Downlink Control Channel), PHICH (Physical hybrid ARQ indicator Channel), etc. The PCFICH is transmitted in a first OFDM symbol of a subframe and carries information about the number of OFDM symbols used for transmission of a control channel within a subframe. The PHICH carries a HARQ ACK/NACK (acknowledgment/negative-acknowledgment) as a response to UL transmission.

Control transmitted via a PDCCH is referred to as downlink control information (DCI). The DCI includes resource allocation information of a UE or a UE group and other control information. For example, the DCI includes transmission format and resource allocation information of a DL shared channel (DL-SCH), transmission format and resource allocation information of a UL shared channel (UL-SCH), paging information on a paging channel (PCH), system information on a DL-SCH, resource allocation information of a higher-layer control message such as a random access response transmitted on a PDSCH, a Tx power control command set of individual UEs in a UE group, a Tx power control command, activation indication information of voice over IP (VoIP), etc. The size and usage of the DCI carried by one PDCCH may be changed according to DCI format and the size of the DCI may be changed according to coding rate.

A plurality of PDCCHs may be transmitted in a PDCCH region of a DL subframe. A UE may monitor a plurality of PDCCHs. A BS decides a DCI format according to DCI to be transmitted to a UE and attaches a cyclic redundancy check (CRC) to the DCI. The CRC is masked with an identifier (e.g., a Radio Network Temporary Identifier (RNTI)) according to an owner or usage of the PDCCH. If the PDCCH is for a specific terminal, a cell-RNTI (C-RNTI) of the terminal may be masked to the CRC. Alternatively, if the PDCCH is for a paging message, a paging indicator identifier (P-RNTI) may be masked to the CRC. If the PDCCH is for system information (more specifically, a system information block (SIB)), a system information identifier and a system information RNTI (SI-RNTI) may be masked to the CRC. If the PDCCH is for a random access response, a random access-RNTI (RA-RNTI) may be masked to the CRC. CRC masking (or scrambling) includes an XOR operation of a CRC and an RNTI at a bit level, for example.

A PDCCH is transmitted on one control channel element (CCE) or an aggregate of a plurality of consecutive CCEs. The CCE is a logical allocation unit used to provide a coding rate to a PDCCH based on a radio channel state. The CCE corresponds to a plurality of resource element groups (REGs). For example, one CCE corresponds to nine REGs and one REG corresponds to four REs. Four QPSK symbols are mapped to each REG. An RE occupied by an RS is not included in an REG. Accordingly, the number of REGs within a given OFDM symbol is changed according to presence/absence of an RS. The REG concept is also used for other DL control channels (that is, a PCFICH and a PHICH). A DCI format and the number of DCI bits are determined according to the number of CCEs.

CCEs are numbered and consecutively used and, in order to simplify decoding, a PDCCH having a format composed of n CCEs may start from only a CCE having a number corresponding to a multiple of n. The number of CCEs used to transmit a specific PDCCH, that is, a CCE aggregation level, is determined by a BS according to a channel state. For example, in case of a PDCCH for a UE having a good DL channel (e.g., a UE adjacent to a BS), one CCE may be sufficient. However, in case of a PDCCH for a UE having a bad channel (e.g., a UE located at a cell edge), 8 CCEs are required to obtain sufficient robustness.

Figure 4:
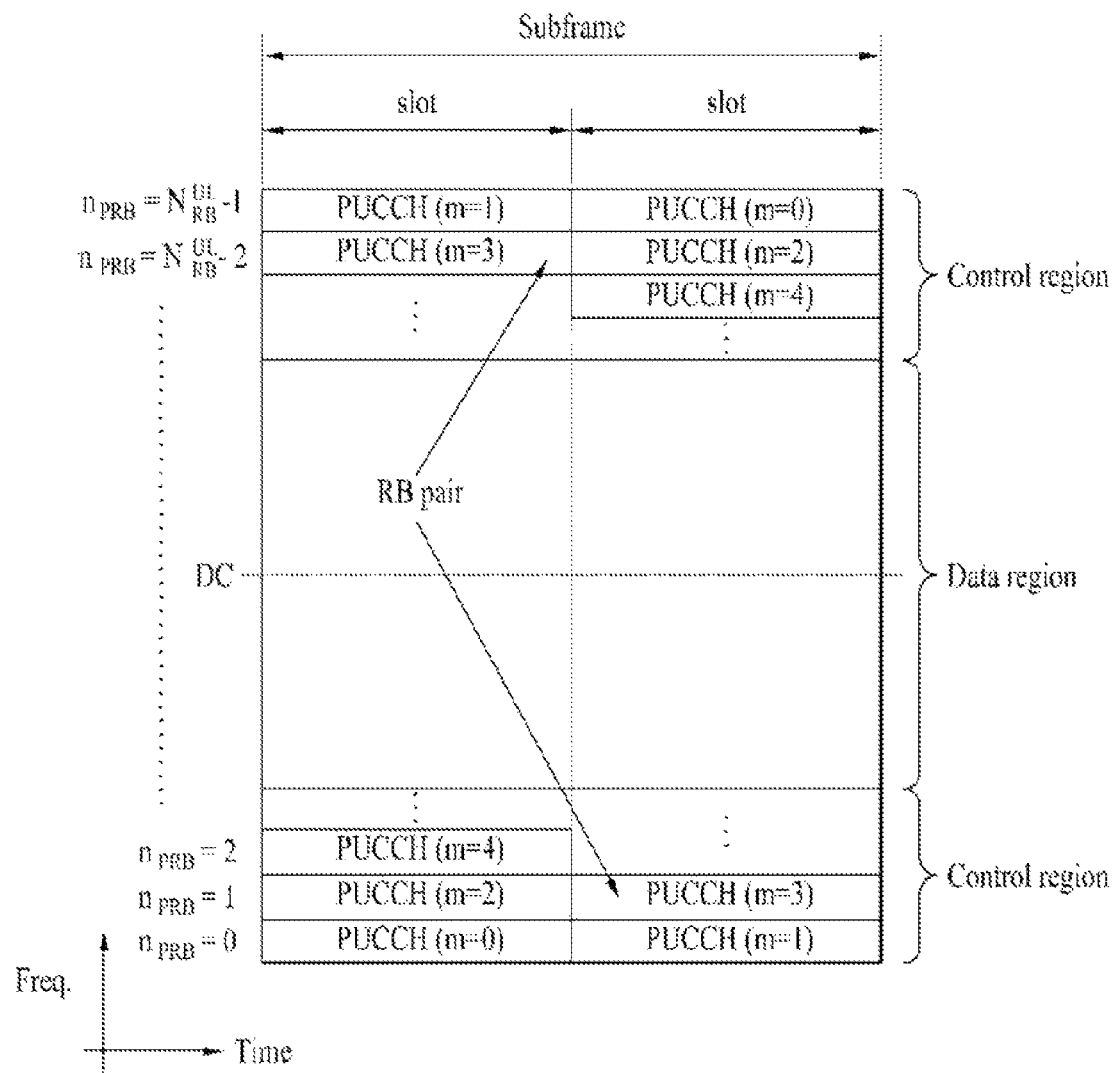
FIG. 4 is a diagram showing an example of an uplink subframe structure used in a 3GPP LTE(-A) system.

FIG. 4 is a diagram showing an example of an uplink subframe structure used in a 3GPP LTE(-A) system.

Referring to FIG. 4, a UL subframe may be divided into a control region and a data region in a frequency domain. One or several physical uplink control channels (PUCCHs) may be allocated to the control region in order to carry uplink control information (UCI). One or several physical uplink shared channels (PUSCHs) may be allocated to the data region of the UL subframe in order to carry user data. The control region and the data region in the UL subframe are also referred to as a PUCCH region and a PUSCH region, respectively. A sounding reference signal (SRS) may be allocated to the data region. The SRS is transmitted on a last OFDM symbol of a UL subframe in a time domain and is transmitted on a data transmission band, that is, a data region, of the UL subframe. SRSs of several UEs, which are transmitted/received on the last OFDM symbol of the same subframe, are distinguished according to frequency location/sequence.

If a UE employs an SC-FDMA scheme in UL transmission, in order to maintain a single carrier property, in a 3GPP LTE release-8 or release-9 system, a PUCCH and a PUSCH may not be simultaneously transmitted on one carrier. In a 3GPP LTE release-10 system, support of simultaneous transmission of a PUCCH and a PUSCH may be indicated by a higher layer.

In a UL subframe, subcarriers distant from a direct current (DC) subcarrier are used as the control region. In other words, subcarriers located at both ends of a UL transmission bandwidth are used to transmit uplink control information. A DC subcarrier is a component which is not used to transmit a signal and is mapped to a carrier frequency $f_0$ in a frequency up-conversion process. A PUCCH for one UE is allocated to an RB pair belonging to resources operating in one carrier frequency and RBs belonging to the RB pair occupy different subcarriers in two slots. The allocated PUCCH is expressed by frequency hopping of the RB pair allocated to the PUCCH at a slot boundary. If frequency hopping is not applied, the RB pair occupies the same subcarrier.

The size and usage of UCI carried by one PUCCH may be changed according to PUCCH format and the size of the UCI may be changed according to a coding rate. For example, the following PUCCH format may be defined.

TABLE 2

| PUCCH format | Modulation scheme | Number of bits per subframe | Usage | Etc. |
|---|---|---|---|---|
| 1 | N/A | N/A (exist or absent) | SR (Scheduling Request) | |
| 1a | BPSK | 1 | ACK/NACK orSR + ACK/NACK | One codeword |
| 1b | QPSK | 2 | ACK/NACK orSR + ACK/NACK | Two codeword |
| 2 | QPSK | 20 | CQI/PMI/RI | Joint coding ACK/NACK (extended CP) |
| 2a | QPSK + BPSK | 21 | CQI/PMI/RI + ACK/NACK | Normal CP only |
| 2b | QPSK + QPSK | 22 | CQI/PMI/RI + ACK/NACK | Normal CP only |
| 3 | QPSK | 48 | ACK/NACK orSR + ACK/NACK orCQI/PMI/RI + ACK/NACK | |

Referring to Table 2, PUCCH format 1 series and PUCCH format 3 series are used to transmit ACK/NACK information and PUCCH format 2 series are mainly used to carry channel state information such as CQI (channel quality indicator)/PMI (precoding matrix index)/RI (rank index).

Figure 5:
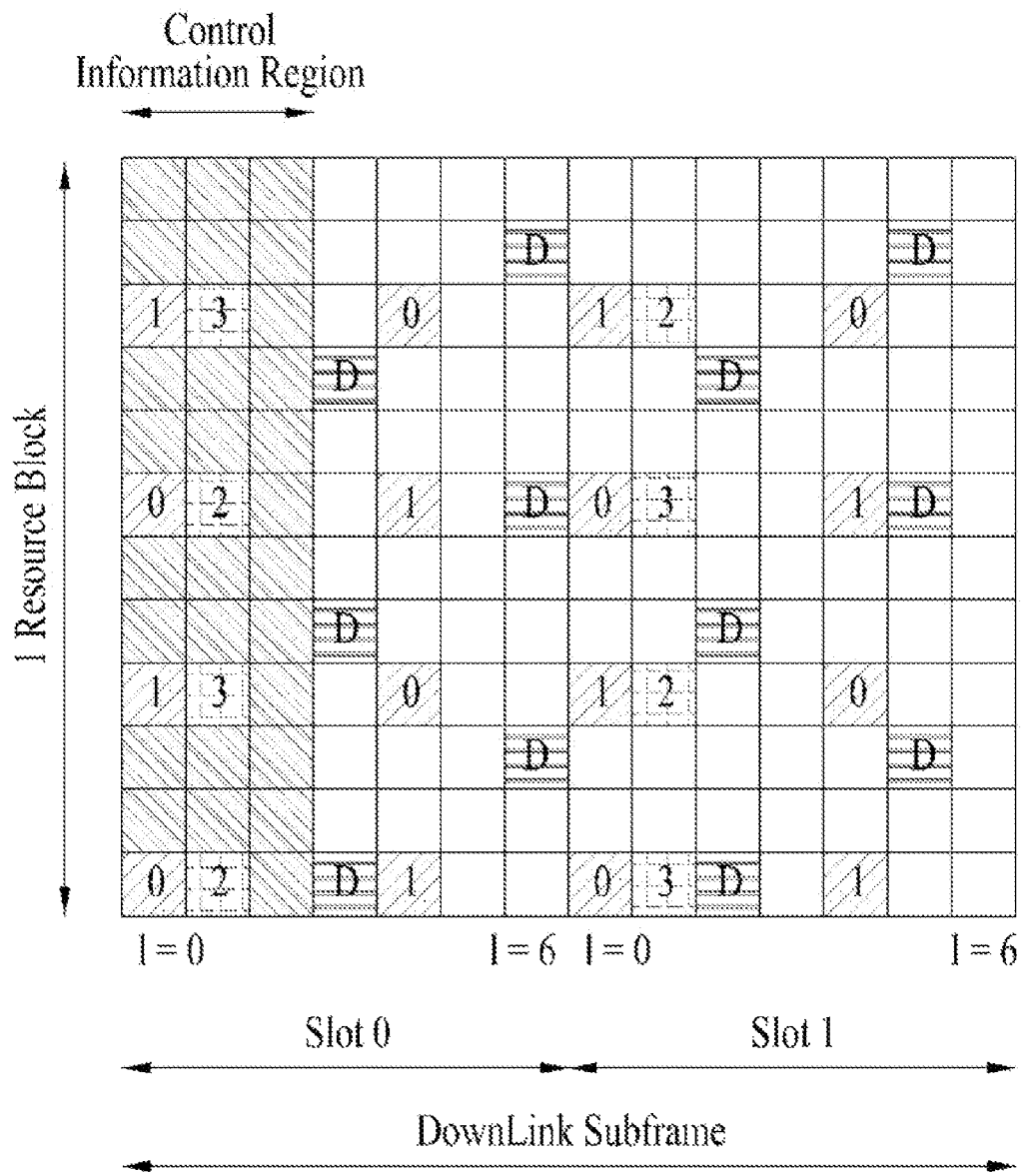
FIGS. 5 and 6 show CRS and DRS patterns defined in a legacy 3GPP LTE system.
Figure 6:
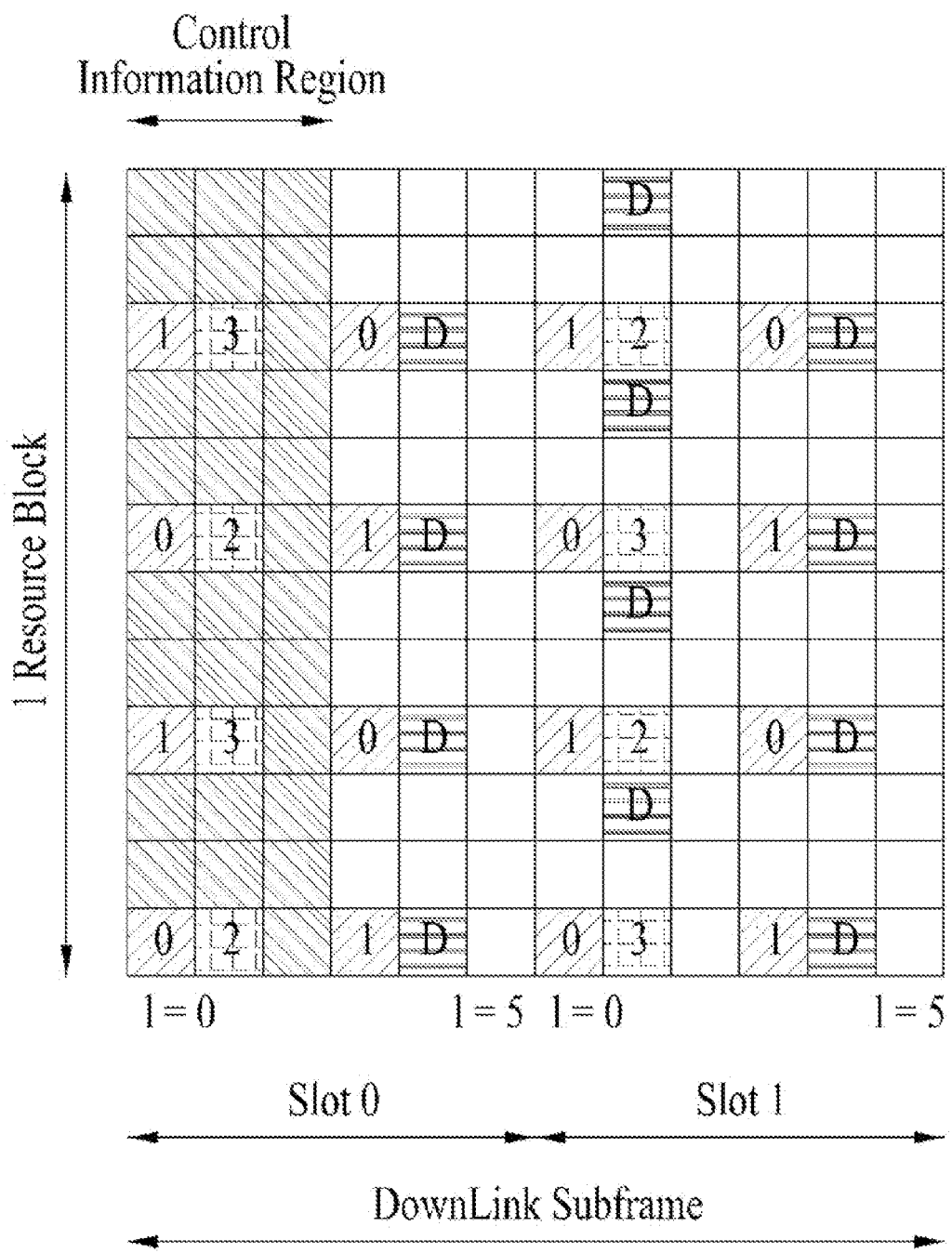

FIGS. 5 and 6 show CRS and DRS patterns mapped onto a downlink RB pair, defined in a legacy 3GPP LTE system (e.g. Release-8). A downlink RB pair as an RS mapping unit may be expressed in units of one subframe in the time domain and 12 subcarriers in the frequency domain. That is, one RB pair has a length of 14 OFDM symbols in a normal Cyclic Prefix (CP) (FIG. 5) and a length of 12 OFDM symbols in an extended CP (FIG. 6) in the time domain.

Prior to description of FIGS. 5 and 6, an RS will now be described.

Reference Signal (RS)

When packets are transmitted in a wireless communication system, the packets are transmitted through a radio channel and thus signal distortion may occur during a signal transmission process. To correctly receive the distorted signal at a reception side, distortion of the received signal should be corrected using channel information. To detect the channel information, a method of transmitting a signal, of which both the transmission side and the reception side are aware to detect the channel information using a distortion degree when the signal is received through a channel is mainly used. The above signal is referred to as a pilot signal or an RS.

When a signal is transmitted and received using multiple antennas, the receiving side should discern a channel state between each transmission antenna and each receive antenna to correctly receive the signal. Accordingly, an additional RS should be present per transmission antenna.

A downlink RS includes a Common Reference Signal (CRS) shared among all UEs in a cell and a Dedicated Reference Signal (DRS) for a specific UE only. It is possible to provide information for channel estimation and demodulation using such RSs.

The reception side (UE) may estimate the channel state from the CRS and feed back an indicator associated with channel quality, such as a Channel Quality Indicator (CQI), a Precoding Matrix Index (PMI) and/or a Rank Indicator (RI), to the transmission side (eNB). The CRS may also be called a cell-specific RS. Alternatively, an RS associated with feedback of Channel State Information (CSI) such as CQI/PMI/RI may be separately defined as a CSI-RS.

The DRS may be transmitted through corresponding REs if data demodulation on a PDSCH is necessary. The UE may receive information about the presence/absence of the DRS from a higher layer and receive information indicating that the DRS is valid only when the PDSCH is mapped. The DRS may also be called a UE-specific RS or a Demodulation Reference Signal (DMRS).

FIGS. 5 and 6 show the locations of RSs on an RB pair in a system in which an eNB supports four transmission antennas. In FIGS. 5 and 6, REs denoted by '0', '1', '2' and '3' indicate the locations of CRSs of antenna port indexes 0, 1, 2 and 3, respectively. In FIGS. 5 and 6, an RE denoted by 'D' indicates the location of a DRS.

Hereinafter, the CRS will be described in detail.

The CRS is used to estimate the channel of a physical antenna and is distributed over the entire band as an RS which is able to be commonly received by all UEs located within a cell. The CRS may be used for CSI acquisition and data demodulation.

The CRS is defined in various formats according to the antenna configuration of the transmission side (eNB). The 3GPP LTE (e.g. Release-8) system supports various antenna configurations and a downlink signal transmission side (eNB) has three types of antenna configuration such as a single antenna, two transmission antennas, and four transmission antennas. If the eNB performs single-antenna transmission, RSs for a single antenna port are arranged. If the eNB performs two-antenna transmission, RSs for two antenna ports are arranged using a Time Division Multiplexing (TDM) and/or Frequency Division Multiplexing (FDM) scheme. That is, the RSs for the two antenna ports are arranged in different time resources and/or different frequency resources so as to be distinguished from each other. In addition, if the eNB performs four-antenna transmission, RSs for four antenna ports are arranged using the TDM/FDM scheme. Channel information estimated by the downlink signal reception side (UE) through the CRSs may be used to demodulate data transmitted using a transmission scheme such as single antenna transmission, transmission diversity, closed-loop spatial multiplexing, open-loop spatial multiplexing, or Multi-User Multiple Input Multiple Output (MU-MIMO).

In the time domain, RSs are arranged starting from a symbol index (1=0) of each slot at a constant interval. The time interval is differently defined according to CP length. The RSs are located on symbol indexes 0 and 4 of the slot in the case of a normal CP and are located on symbol indexes 0 and 3 of the slot in the case of an extended CP. Only RSs for a maximum of two antenna ports are defined in one OFDM symbol. Accordingly, upon four-transmission antenna transmission, the RSs for antenna ports 0 and 1 are located within the symbol indexes 0 and 4 (the symbol indexes 0 and 3 in case of the extended CP) of the slot and the RSs for antenna ports 2 and 3 are located within the symbol index 1 of the slot. The frequency locations of the RSs for the antenna ports 2 and 3 are exchanged with each other in the second slot.

Hereinafter, the DRS will be described in detail.

The DRS (or UE-specific RS) is used to demodulate data. A precoding weight used for a specific UE upon multi-antenna transmission is also used in an RS without change so as to estimate an equivalent channel, in which a transport channel and the precoding weight transmitted from each transmission antenna are combined, when the UE receives the RSs.

A legacy 3GPP LTE system (e.g. Release-8) supports a maximum of four-transmission antenna transmission and defines a DRS for Rank 1 beamforming. The DRS for Rank 1 beamforming is also denoted by an RS for an antenna port index 5.

In an LTE-Advanced (LTE-A) system which is an evolved version of the 3GPP LTE system, high-order MIMO, multi-cell transmission, evolved MU-MIMO, or the like is considered. To support efficient RS management and an evolved transmission scheme, DRS-based data demodulation is considered. That is, separately from the DRS (antenna port index 5) for Rank 1 beamforming defined in the legacy 3GPP LTE (e.g. Release-8) system, DRSs for two or more layers may be defined in order to support data transmission through an added antenna.

Intercell Interference Reduction

If two eNBs (eNB1 and eNB2) are contiguously arranged such that partial coverage of the two eNBs overlaps, a UE served by one eNB may be subjected to interference by a strong downlink signal from the other eNB. For example, if a micro eNB (eNB2) is located within coverage of a macro eNB (eNB1), a UE (UE2) served by the micro eNB (eNB2) may be subjected to interference by a signal from the macro eNB (eNB1). If intercell interference is generated as stated above, the two eNBs may reduce intercell interference through intercell cooperation.

In various exemplary embodiments of the present invention which will be described hereinbelow, it is assumed that signals are smoothly transmitted and received between two eNBs that cause interference and are subjected to interference.

For example, it is assumed that a wired/wireless link (e.g. backhaul link or Un interface) in which a transmission condition, such as transmission bandwidth or time delay, between two eNBs is good is present and thus reliability for transmission and reception of a cooperation signal between the eNBs is high.

It is also assumed that time synchronization between two eNBs is matched within a permissible error range (e.g. the case in which boundaries between downlink subframes of two eNBs that cause interference and are subjected to interference are aligned) and the two eNBs definitely recognize an offset of subframe boundaries between the two eNBs.

For example, eNB1 may be a macro eNB providing a service with a high transmission power to a wide area and eNB2 may be a micro eNB (e.g. pico eNB) providing a service with a low transmission power to a narrow area. If the UE (UE2) that is located in a cell boundary area of eNB2 and is served by eNB2 is subjected to strong interference from eNB1, it may be difficult to perform effective communication without proper inter-cell cooperation.

Especially, there is a high possibility that such intercell interference occurs in a situation in which many UEs are connected to the micro eNB (eNB2) having a low power to disperse load caused by service provision of the macro eNB (eNB1).

For example, if the UE desires to select a serving eNB, receive powers of downlink signals from respective eNBs may be calculated and compared using a scheme of adding a prescribed adjustment value (bias value) to the receive power from the micro eNB and not adding the adjustment value to the receive power from the macro eNB and, as a result, the UE may select an eNB providing a higher downlink receive power as the serving eNB. Accordingly, it is possible to connect more UEs to the micro eNB.

Although the strength of a downlink signal received by the UE from the macro eNB is much stronger than that received from the micro eNB, the micro eNB may be selected as the serving eNB and thus the UE connected to the micro eNB may be subjected to strong interference from the macro eNB. In this case, UEs located at the boundary of the micro eNB may have difficulty performing correct operation due to strong interference from the macro eNB unless additional intercell cooperation is provided.

Meanwhile, such occurrence of intercell interference is purely exemplary and it is apparent that embodiments described in the present invention are identically applicable to situations different from the above case, (e.g. the case in which the micro eNB causes interference and the macro eNB is subjected to interference or the case in which intercell interference occurs between micro eNBs or between macro eNBs).

Figure 7:
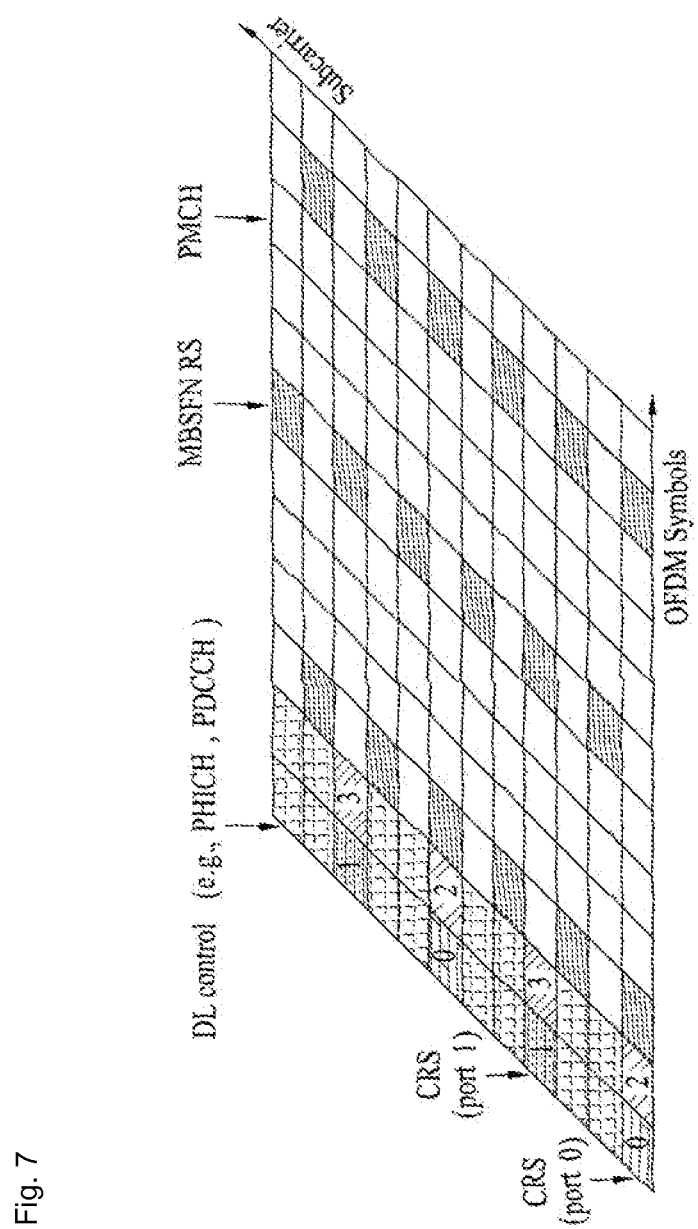
FIG. 7 shows an MBSFN subframe according to a legacy LTE system.

In a wireless communication system such as 3GPP LTE, an Energy Per Resource Element (EPRE) indicating an energy value of each RE is defined for transmission power allocation of a downlink resource. FIG. 7 shows an exemplary embodiment of power allocation to each RE included in a downlink subframe.

In FIG. 7, X axis, Y axis, and Z axis denote an OFDM symbol, a subcarrier, and a transmission power, respectively.

An eNB determines transmission power allocation of a downlink resource as an energy value of each RE. The transmission power allocation of the downlink resource is determined based on an EPRE for a CRS and an EPRE for a resource region of a PDSCH on which data is actually transmitted is expressed in the ratio to an EPRE of the CRS.

For example, the ratio of the EPRE of the PDSCH to the EPRE of the CRS in an OFDM symbol duration in which the CRS is not present in a downlink subframe in the time domain is defined as $\rho_A$ and the ratio of the EPRE of the PDSCH to the EPRE of the CRS in an OFDM symbol duration in which the CRS is present in a downlink subframe in the time domain is defined as $\rho_B$.

At this time, $\rho_A$ may be determined by a power offset $\delta_{power-offset}$ according to whether an MU-MIMO transmission structure is applied and by a UE-$\delta_{power-offset}$ $\delta_{power-offset}$ may be given as 0 dB for all PDSCH transmission schemes except for MU-MIMO and the UE-specific parameter $P_A$ may be signaled to the UE by a higher layer. $\rho_B/\rho_A$ may be determined by the number of antenna ports which are cell-specifically configured and a cell-specific parameter $P_B$ which is signaled by the higher layer and may be given as shown in Table 3 below.

TABLE 3

| $P_B$ | $\rho_B/\rho_A$ | |
|---|---|---|
| | One Antenna Port | Two and Four Antenna Ports |
| 0 | 1 | 5/4 |
| 1 | 4/5 | 1 |
| 2 | 3/5 | 3/4 |
| 3 | 2/5 | 1/2 |

Meanwhile, a dynamic range of a transmission power for each RE in an LTE wireless communication system, etc. may be limited as shown in Table 4 according to requirements on a radio frequency (e.g. Error Vector Magnitude (EVM) and out-of-band emission).

TABLE 4

| Modulation scheme used on the RE | RE power control dynamic range (dB) | |
|---|---|---|
| | (down) | (up) |
| QPSK(PDCCH) | −6 | −4 |
| QPSK(PDSCH) | −6 | −3 |
| 16QAM(PDSCH) | −3 | −3 |
| 64QAM(PDSCH) | 0 | 0 |

Table 4 shows an example of a dynamic range of RE transmission power control according to a modulation scheme of an E-UTRA eNB. The dynamic range of transmission power control for RE indicates a difference between a transmission power for each RE and an average transmission power for REs when an eNB transmits data at a maximum transmission power under a specified reference condition. The transmission power of an RE may be restricted by requirements for out-of-band emission, requirements for an EVM, and the like. Here, out-of-band emission is one form of unwanted emission and refers to emission on a frequency immediately outside a bandwidth of a channel as a result of non-linearity of a modulation process and a transmitter. The EVM refers to a difference between an ideal symbol and a measured symbol after quantization and this difference is called an error vector. The EVM is defined as a square root of the ratio of a mean reference power to a mean error vector power and may be expressed in percent.

The dynamic range of a transmission power for each RE of Table 4 may be determined by an upper limit (up) and a lower limit (down) of the transmission power for each RE based on the transmission power for each RE when an eNB transmits a signal at a maximum transmission power under a specified reference condition. Specifically, the upper limit of the transmission power for each RE may be determined by requirements for out-of-band emission according to non-linearity of the above-described modulation process and transmitter. The lower limit of the transmission power for each RE may be determined by requirements for the above-described EVM.

Accordingly, in an environment shown in Table 4, the transmission power of a specific subframe (e.g. NZP-ABS) may be restricted by the lower limit of Table 4. In this case, power allocation for the resource of a downlink subframe, determined by $\rho_A$ and $\rho_B$ in a normal downlink subframe transmitted through higher layer signaling from the eNB to the UE may be ineffective in a specific subframe (e.g. NZP-ABS).

Hereinafter, a method for allocating power or providing power information will be described for a multicast broadcast single frequency network (MBSFN) subframe according to an exemplary embodiment of the present invention.

The present invention proposes a method for using a CRS according to configuration of a reduced power almost blank subframe (r-ABS) or raising transmission powers of a UE-specific RS (hereinafter, a UE-RS) and a CSI-RS, when transmitting unicast data in an MBSFN subframe configured as the r-ABS for intercell interference coordination (ICIC) in a multi-cell wireless communication environment having intercell interference, thereby improving data demodulation performance in the MBSFN subframe.

FIG. 7 shows an MBSFN subframe according to a legacy LTE system. In a wireless communication system including 3GPP LTE, an LTE multimedia broadcast/multicast service (MBMS) is defined in order to efficiently provide broadcast and multicast services. The LTE MBMS applies a radio interface for transmitting broadcast and multicast data in a structure in which multiple cells operate like one synchronized single frequency network. Meanwhile, in an aspect of a physical layer, the MBSFN data is transmitted in correspondence to a physical multicast channel (PMCH) and the PMCH recognizes a valid channel of a form in which channels of multiple cells are combined. Accordingly, in the PMCH, an MBSFN RS for estimating the valid channel is additionally transmitted. When the PMCH and a PDSCH coexist in a specific subframe of a frequency domain, a UE may bear the burden of simultaneously performing CRS based channel estimation and MBSFN RS based channel estimation. In LTE, in order to solve the above problem, a subframe in which the PMCH is transmitted is referred to as an MBSFN subframe and the MBSFN subframe has constraints of not transmitting the PDSCH therein. Accordingly, the MBSFN subframe includes a downlink control region within a first and/or second OFDM symbol(s) and the other regions, i.e. the PMCH. The CRS is transmitted in the control region, whereas no CRS is present in the PMCH. FIG. 7 shows the MBSFN subframe when the CRS is configured through four antenna ports.

Figure 8:
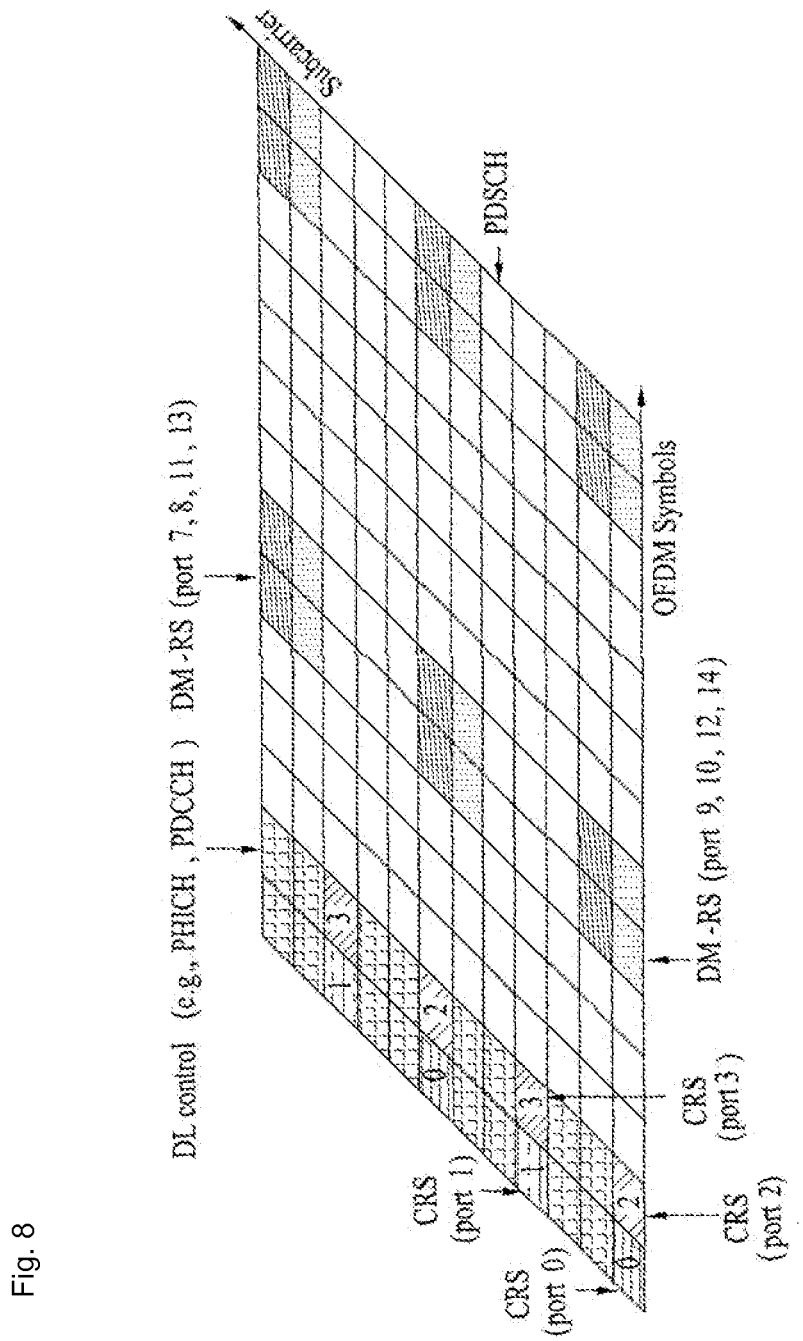
FIG. 8 shows an MBSFN subframe in an LTE-A system according to an exemplary embodiment of the present invention.

FIG. 8 shows an MBSFN subframe in an LTE-A system according to an exemplary embodiment of the present invention. The MBSFN subframe is semi-statically allocated according to system information block (SIB) type 2 which is system information transmitted through a higher layer. The system information may be updated at an interval of about two or three times per hour. Therefore, the transmission pattern of the MBSFN subframe may continue for a considerable time. However, data transmission for the MBMS is not always performed and, therefore, partial resources among allocated MBSFN subframes may not be used for the MBMS.

In LTE-A, a method of using the unused MBSFN subframe has been discussed and, in consideration of the fact that legacy LTE UEs do not expect that unicast data will be transmitted in the MBSFN subframe, a method for transmitting the unicast data for LTE-A UEs through the MBSFN subframe has been proposed.

FIG. 8 depicts the configuration of the MBSFN subframe in which the unicast data is transmitted in an environment in which 4 antenna ports are configured for CRSs and 8 antenna ports are configured for UE-RSs (e.g. DM-RSs). The CRSs are transmitted only in the control region of the MBSFN subframe and signals for the LTE-A UE, such as the PDSCHs, UE-RSs, CSI-RSs, etc., are transmitted in the other regions except for the control region.

Hereinafter, it is defined that each MBSFN subframe is divided into an MBSFN region and a non-MBSFN region, the non-MBSFN region corresponds to a first OFDM symbol and/or a second OFDM symbol in the MBSFN subframe, and the MBSFN region corresponds to the other OFDM symbols which are not used for the non-MB SFN region. It is apparent that the control region of the MBSFN subframe corresponds to the non-MBSFN region and the data region of MBSFN subframe corresponds to the MBSFN region.

Meanwhile, in an LTE-A system, an Almost Blank Subframe (ABS) structure has been proposed as one ICIC scheme for solving interference in a heterogeneous cell environment. To solve the interference problem, an eNB may configure or set a specific MBSFN subframe as an ABS of a reduced power. Generally, the ABS refers to a subframe in which signals except for control related signals such as an RS are not transmitted or the signals are transmitted at a power value of 0. That is, the ABS corresponds to a subframe in which signals except for the RS are almost blank. In this disclosure, a reduced power ABS (r-ABS) refers to a subframe in which signals are transmitted at a power lower than a transmission power of a normal subframe but at a power higher than a power value of 0.

For instance, a subframe (which is not an MBSFN subframe) configured as an ABS may refer to a subframe in which only CRSs are transmitted in a control region and a data region and other control information and data are not transmitted. Nonetheless, downlink channels and downlink signals such as a physical broadcast channel (PBCH), a primary synchronization signal (PSS), and a secondary synchronization signal (SSS) may be transmitted even in the ABS.

For example, the MBSFN subframe configured as the r-ABS (hereinafter, an ABS MBSFN subframe) may refer to a subframe in which, in a control region of the ABS MBSFN subframe, signals are transmitted at a transmission power according to a conventional power allocation scheme and, in the data region of the ABS MBSFN subframe, downlink signals are transmitted at a power lower than the transmission power according to the conventional power allocation scheme.

In this specification and claims, the ABS and r-ABS will be used interchangeably. That is, the r-ABS may mean both the ABS and the r-ABS and the ABS may mean both the ABS and the r-ABS.

Figure 9:
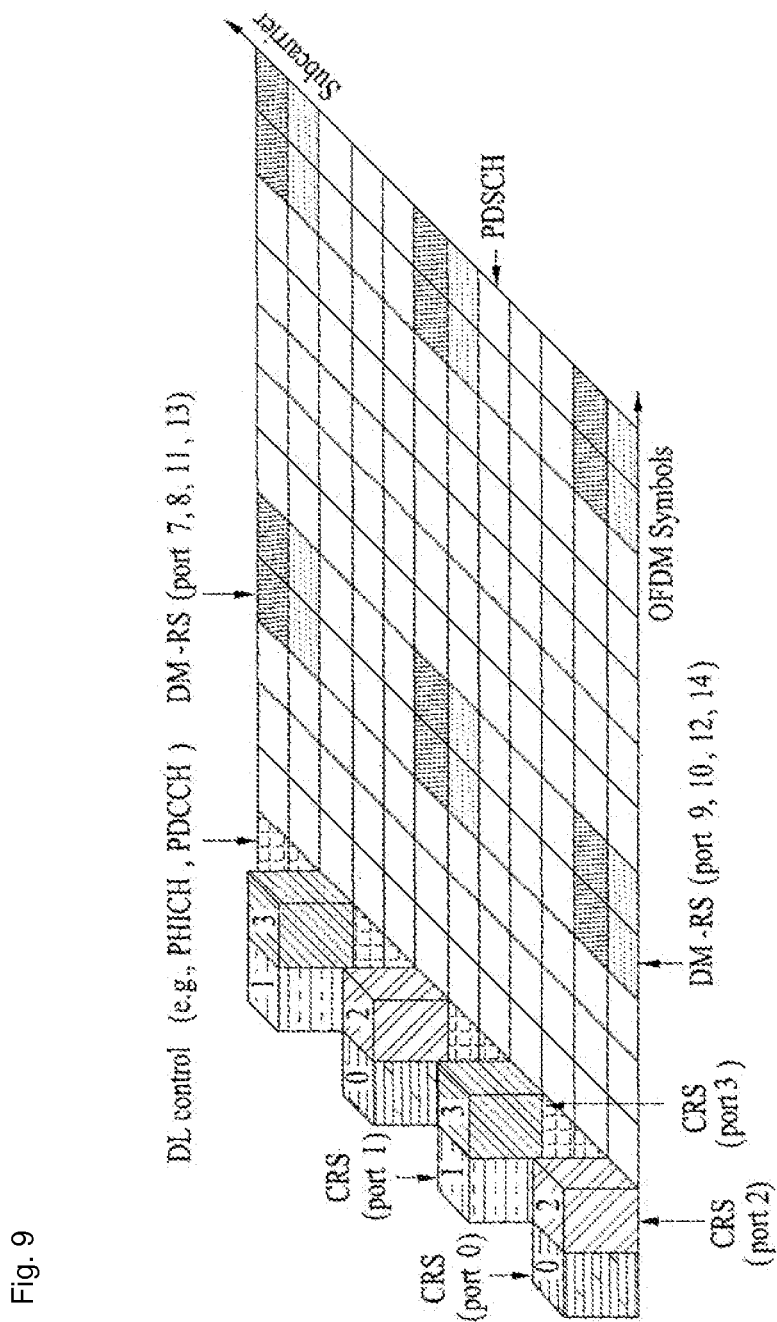
FIG. 9 shows an MBSFN subframe in an LTE-A system according to an exemplary embodiment of the present invention.

In the ABS or r-ABS, RSs (e.g. CRSs) for legacy LTE UEs that do not support LTE-A and system information (e.g. PBCHs, SIBs, PSSs, SSSs, etc.) are transmitted and other unicast data is not transmitted or is transmitted at a very low transmission power. In this case, if an MBSFN subframe used for unicast data transmission is configured as the r-ABS, a transmission power of a CRS in the MBSFN subframe is maintained and unicast data such as a PDCCH and a PDSCH is transmitted at a lower transmission power PABS in order to support legacy UEs. Accordingly, in the MBSFN subframe configured as the r-ABS, the CRS has an effect of raising the transmission power relative to a DM-RS in the data region of the MBSFN subframe as shown in FIG. 9. Power allocation information in the r-ABS may be transmitted to a UE receiving data through the r-ABS so as to be used for data demodulation and may be transmitted to a UE affected by interference from the r-ABS so as to be used for interference elimination. Accordingly, an eNB may transmit transmission power information for the MBSFN subframe to at least one UE.

In other words, even if the r-ABS is applied according to the ICIC scheme, a transmission power of common control data such as a CRS may be maintained at a power when the r-ABS is not applied, in terms of importance of data or stability of overall system operation.

The present invention proposes a method for supporting CRS transmission at a reduced transmission power in an r-ABS according to an ICIC scheme in a subset of a specific MBSFN subframe, when transmitting unicast data in an MBSFN subframe in a multi-cell wireless communication system environment. In addition, the present invention proposes a method for supporting a CRS based data transmission mode and a DM-RS based data transmission mode, using resource allocation information. As an embodiment of the present invention, an operation of the present invention will be described hereinbelow in the case in which an MBSFN subframe for transmitting unicast data is configured as an r-ABS.

An operation is described for transmitting to a user equipment information about a transmission mode allocating CRSs to an MBSFN region of an MBSFN subframe transmitting unicast data according to an embodiment of the present invention. An LTE Rel-8/9/10 UE assumes that no CRSs are transmitted in a region except for a control signal region of the MBSFN subframe. However, according to the present invention, information about support of CRS transmission in the MBSFN region of a specific MBSFN subframe is provided to the UE and the UE may receive CRS based unicast data using the information. Meanwhile, an MBSFN-SubframeConfig field is defined in an SIB type 2 which is system information transmitted by a higher-layer signal of the LTE system and includes bit map information for the MBSFN subframe and MBSFN subframe allocation period information. The present invention proposes a method for transmitting MBSFN subframe bitmap information supporting CRS transmission as a subset of bitmap information of the MBSFN subframe to the UE. That is, information as to whether a subframe configured as an MBSFN subframe in MBSFN-SubframeConfig is a subframe in which CRSs of a reduced transmission power are transmitted is additionally transmitted to a UE (e.g. a UE supporting Rel-11). In addition, at least one of CRS EPRE information, information about the ratio to existing CRS EPRE, and the number of CRS antenna ports may be transmitted to the UE by a higher-layer signal in order to support an operation for transmitting CRSs at a reduced transmission power in an MBSFN region of an MBSFN subframe configured as an r-ABS. The number of antenna ports for CRS transmission in a subframe in which CRSs of a reduced transmission power are transmitted may be different from the number of antenna ports for CRS transmission in a subframe in which normal CRSs are transmitted.

Figure 10:
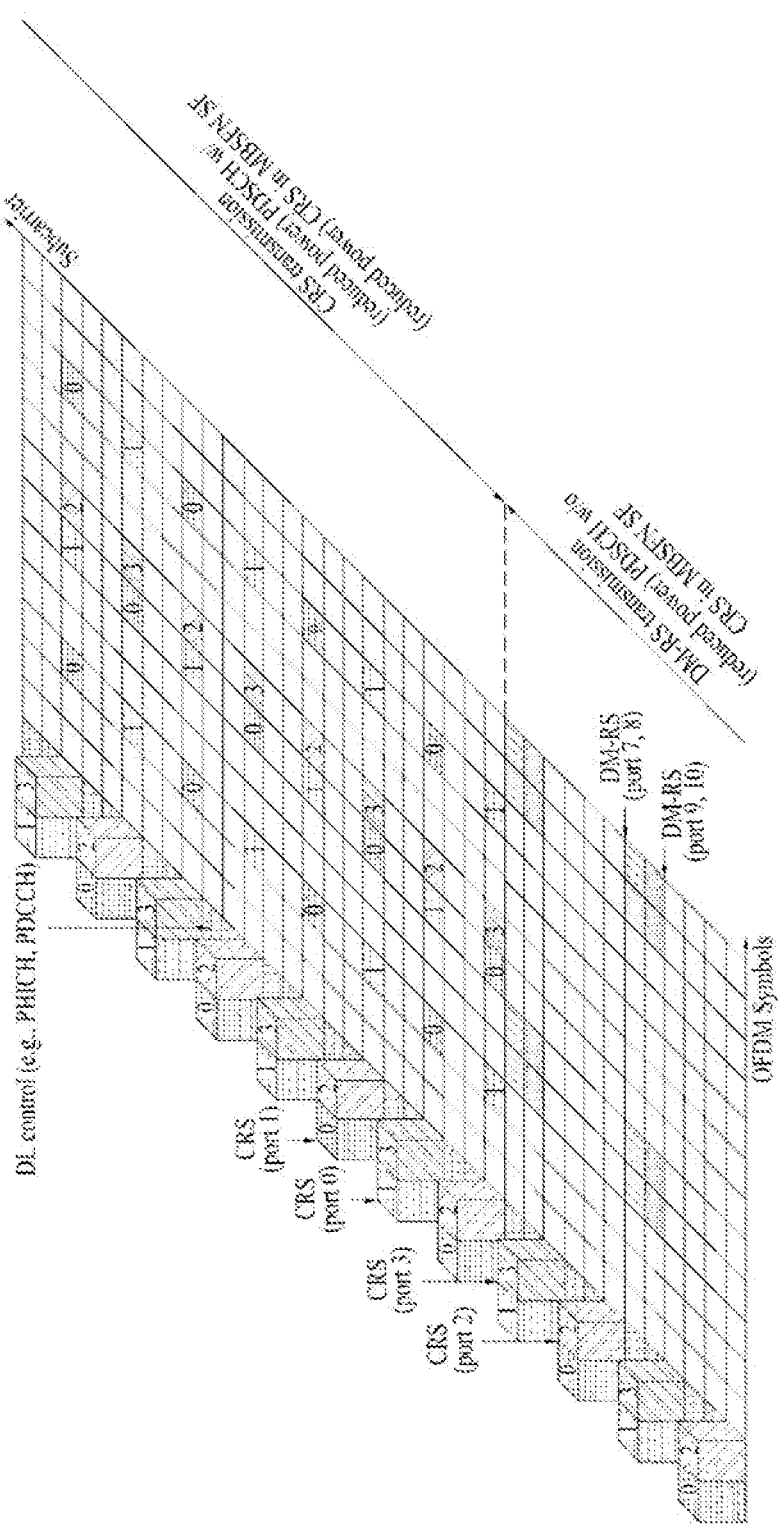
FIG. 10 shows an MBSFN subframe in an LTE-A system according to an exemplary embodiment of the present invention.

A method for supporting a CRS based transmission mode and/or a DM-RS based transmission mode in an MBSFN subframe transmitting unicast data according to an embodiment of the present invention will now be described. An LTE Rel-10 UE can expect transmission of the unicast data in the MBSFN subframe but does not expect CRS transmission in a region except for a non-MB SFN region of the MBSFN subframe. On the other hand, according to an embodiment of the present invention, the UE may operate in the CRS based transmission mode or the DM-RS based transmission mode in a specific MBSFN subframe, based on the MBSFN subframe bitmap information supporting CRS transmission in an MBSFN region. If the LTE-Rel-10 UE and a UE according to the embodiment of the present invention are scheduled in the same MBSFN subframe, CRS transmission is not required in a resource region allocated for the LTE Rel-10 UE because CRSs are not useful and the CRSs may deteriorate data modulation performance, whereas CRS transmission may be necessary in the resource region allocated for the UE according to the embodiment of the present invention according to a transmission mode of the corresponding UE. Accordingly, the present invention can support the CRS based transmission mode and the DM-RS based transmission mode by selectively transmitting CRSs at a transmission power different from existing CRSs in the same MBSFN subframe transmitting unicast data as illustrated in FIG. 10.

A method is described for semi-statically transmitting CRSs (hereinafter, referred to as reduced (r)?CRSs) capable of being transmitted at a transmission power different from existing CRSs, e.g. a transmission power lower than the existing CRSs through fixed partial time-frequency resource regions in the MBSFN region of the MBSFN subframe transmitting the unicast data according to an embodiment of the present invention. The r-CRSs are signals usable commonly only for UEs supporting the operation of the embodiment of the present invention and may be preferably allocated in consecutive time-frequency resources in order to perform more precise time-frequency synchronization based on a property of high density as in the existing CRSs. Therefore, in the embodiment of the present invention, a specific time-frequency resource region to which the r-CRSs are allocated is configured in the MBSFN region of the MBSFN subframe so that UEs supporting the CRS based transmission mode in the MBSFN subframe can be scheduled in the specific time-frequency resource region. Information about the specific time-frequency resource region in which the r-CRSs ares transmitted may be transmitted to the UE through a higher-layer signal.

If a part of time-frequency resource regions allocated to the UE are a specific time-frequency resource region in which the r-CRSs are transmitted and if the UE operates in the DM-RS based transmission mode, DM-RSs may be allocated even in the specific time-frequency resource region so that the UE can perform a DM-RS based operation. If the UE performs the DM-RS based operation, the time-frequency resource region in which the r-CRSs are transmitted may be allocated as PDSCHs. In this case, the UE may perform a PDSCH reception operation under the assumption that the PDSCHs are not mapped into REs in which the r-CRSs are transmitted only in the time-frequency resource region. And, the UE may perform a PDSCH reception operation under the assumption that the PDSCHs are mapped into REs in which the r-CRSs are allocated in a time-frequency resource region in which the r-CRSs are not transmitted. This means that a set of REs to which the PDSCHs are mapped varies according to a time-frequency resource region.

As an alternative for preventing complexity of such an operation, it may be assumed that the PDSCHs are not mapped to REs in which the CRSs are transmitted in all time-frequency resource regions when a part of time-frequency resource regions in which the r-CRSs are transmitted are allocated in the case where the UE operates in the DM-RS based transmission mode. An another alternative, if time-frequency resources allocated to the PDSCHs partially overlap with resource regions in which the CRSs are transmitted in the DM-RS based transmission mode, it may be assumed that the PDSCHs are not allocated all over the overlapping time-frequency resource regions. This method has an advantage of flexibility in scheduling because an r-CRS transmission region may be not included in the PDSCHs under the situation where it is difficult to avoid a CRS transmission region by allocation of consecutive resource blocks such as a resource allocation type 2 to the PDSCHs. On the contrary, when the UE operates in the CRS based transmission mode, resource allocation information may not consider a resource region in which the r-CRSs are not transmitted. That is, the UE assumes that the PDSCHs are not transmitted in a resource region in which the CRSs are not transmitted. The UE may discriminate whether a PDSCH transmission scheme is the DM-RS based transmission mode or the CRS based transmission mode according to a DCI format transmitted thereto through PDCCH monitoring.

A method for combining control signal information for the CRS and DM-RS based transmission modes in an MBSFN subframe transmitting unicast data according to an embodiment of the present invention is described. UEs supporting an operation according to the embodiment of the present invention support two transmission modes divided into the CRS based transmission mode and the DM-RS based transmission mode in the MBSFN subframe. Accordingly, the number of blind decoding (BD) procedures may be increased when the UE monitors a PDCCH thereof in the MBSFN subframe in which CRS transmission is supported. In other words, if it is assumed that a transmission mode TM9 which is the DM-RS based transmission mode is previously configured for the UE, DCI formats 1A and 2C of different lengths available in TM9 may be transmitted to the UE through a PUCCH. The UE performs BD upon the PDCCH in consideration of the lengths of the two DCI formats and may detect a DCI format allocated thereto through the BD procedure. In this case, if the CRS based transmission mode is supported, the UE should perform BD even upon a DCI format of another length, e.g. DCI format 2, and thus the number of BD procedures performed by the UE is increased.

To solve such a problem, the present invention proposes a DCI format capable of combining two transmission modes. For example, DCI format 2C supporting the DM-RS based transmission mode (e.g. TM9) and DCI format 2A or DCI format 2 supporting the CRS based transmission mode (e.g. TM3 or TM4) may be combined.

Figure 11:
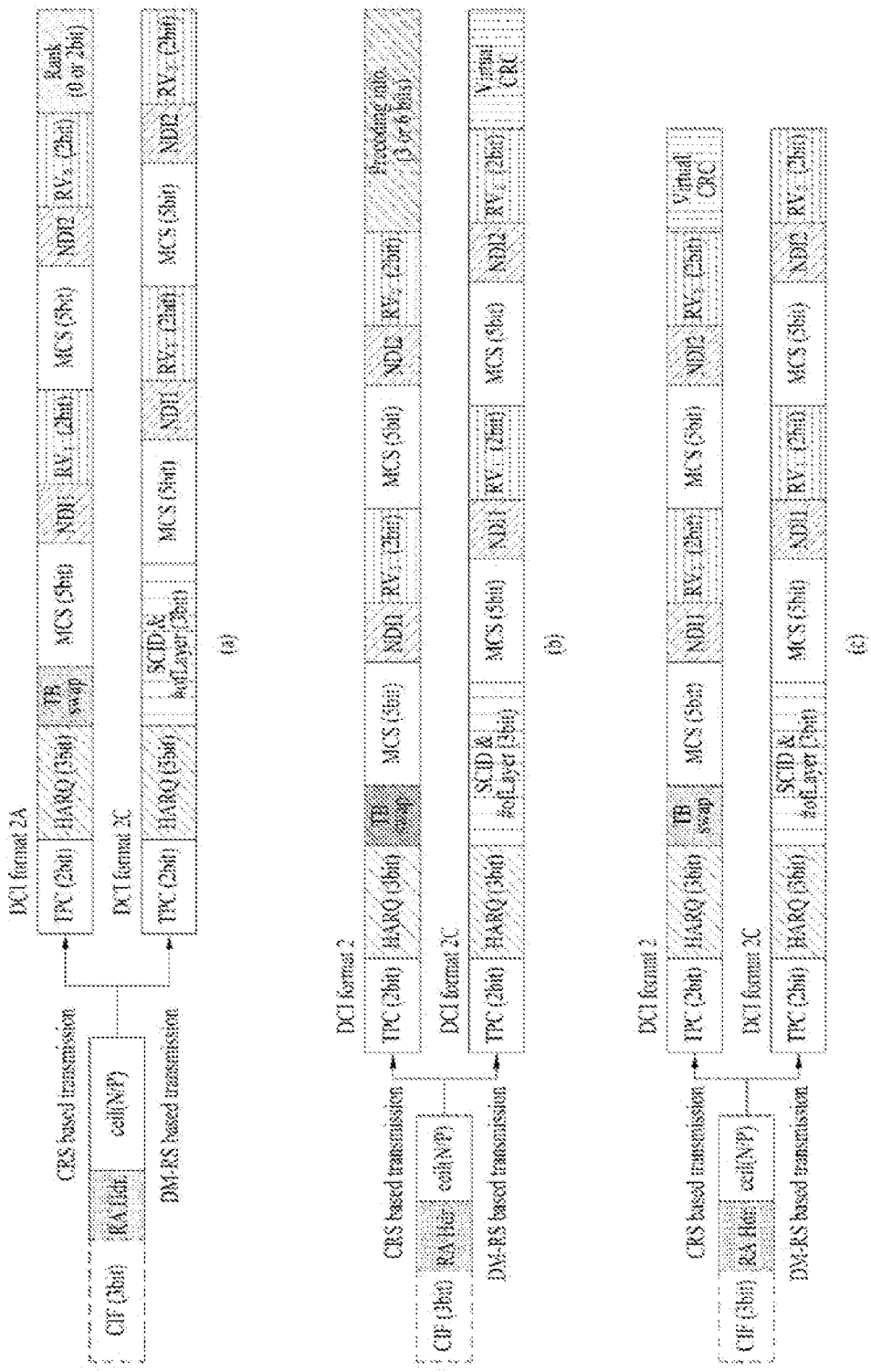
FIG. 11 shows a downlink control information (DCI) according to an exemplary embodiment of the present invention.
Figure 12:
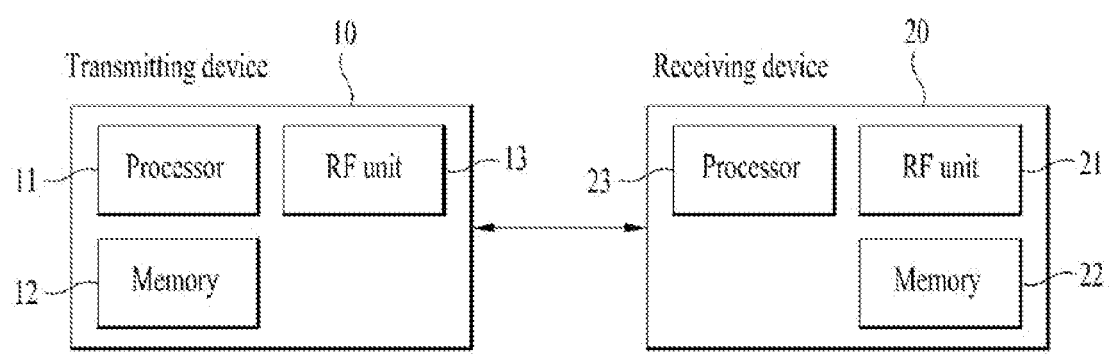
FIG. 12 is a block diagram of an apparatus for implementing exemplary embodiments of the present invention.

FIG. 11(*a*) illustrates a DCI (downlink control information) format in which DCI format 2C and DCI format 2A having the same length are combined. The UE may have the DCI format 2C as a basic form and, if a CRS is transmitted in a resource for the UE, the UE may interpret the CRS in the DCI format 2A.

FIG. 11(b) illustrates a DCI (downlink control information) format in which DCI format 2 and DCI format 2C having different lengths are combined. If the DCI format 2 is a basic form, TM4 which is the CRS based transmission mode can be supported and, in the case of operation in TM9, 3 bits among 6 bits for precoding information may be used for a scrambling ID and the number of layers and the other 3 bits and 1 bit related to transport block swap may be used for a virtual CRC.

FIG. 11(c) illustrates a DCI (downlink control information) format in which DCI format 2 and DCI format 2C having different lengths are combined. The UE may have the DCI format 2C as a basic form. In TM4, precoding information uses a form excluded from the DCI format 2 under the assumption that previous information is used and 2 bits less than the length of the DCI format 2C may be allocated to a virtual CRC.

According to the embodiment of the present invention, upon detecting the DCI format transmitted to the UE through PDCCH monitoring, the UE recognizes a transmission scheme as the CRS based transmission mode if all transmission resources allocated for the PDSCH belong to a time-frequency resource region in which CRSs are transmitted and recognizes a PDSCH transmission scheme as the DM-RS based transmission mode if a part of transmission resources allocated for the PDSCH belong to a time-frequency resource region in which the CRSs are not transmitted. The UE receives data according to the recognized transmission mode. A PDSCH scheduler may be restricted so that downlink resource allocation does not occur over both a CRS transmission time-frequency region and CRS non-transmission time-frequency region. If such restriction is imposed, the UE can reduce an error probability of detecting a DCI message by performing a detection operation under the assumption that occurrence of restricted resource allocation is judged as a communication error in detecting a DCI message associated with downlink resource allocation.

In addition, the methods proposed in the present invention are applicable even to subframes except for the MBSFN subframe, i.e. subframes of a new carrier type.

FIG. 13 is a block diagram of an apparatus configured to implement exemplary embodiments of the present invention.

A transmitting device 10 and a receiving device 20 respectively include Radio Frequency (RF) units 13 and 23 for transmitting and receiving radio signals carrying information, data, signals, and/or messages, memories 12 and 22 for storing information related to communication in a wireless communication system, and processors 11 and 21 connected operationally to the RF units 13 and 23 and the memories 12 and 22 and configured to control the memories 12 and 22 and/or the RF units 13 and 23 so as to perform at least one of the above-described embodiments of the present invention.

The memories 12 and 22 may store programs for processing and controlling the processors 11 and 21 and may temporarily storing input/output information. The memories 12 and 22 may be used as buffers.

The processors 11 and 21 control the overall operation of various modules in the transmitting device 10 or the receiving device 20. The processors 11 and 21 may perform various control functions to perform the present invention. The processors 11 and 21 may be called controllers, microcontrollers, microprocessors, or microcomputers. The processors 11 and 21 may be implemented by hardware, firmware, software, or a combination thereof. In a hardware configuration, Application Specific Integrated Circuits (ASICs), Digital Signal Processors (DSPs), Digital Signal Processing Devices (DSPDs), Programmable Logic Devices (PLDs), or Field Programmable Gate Arrays (FPGAs) may be included in the processors 11 and 21. If the present invention is implemented using firmware or software, firmware or software may be configured to include modules, procedures, functions, etc. performing the functions or operations of the present invention. Firmware or software configured to perform the present invention may be included in the processors 11 and 21 or stored in the memories 12 and 22 so as to be driven by the processors 11 and 21.

The processor 11 of the transmitting device 10 is scheduled from the processor 11 or a scheduler connected to the processor 11 and codes and modulates signals and/or data to be transmitted to the exterior. The coded and modulated signals and/or data are transmitted to the RF unit 13. For example, the processor 11 converts a data stream to be transmitted into K layers through demultiplexing, channel coding, scrambling and modulation. The coded data stream is also referred to as a codeword and is equivalent to a transport block which is a data block provided by a Medium Access Control (MAC) layer. One Transport Block (TB) is coded into one codeword and each codeword is transmitted to the receiving device in the form of one or more layers. For frequency up-conversion, the RF unit 13 may include an oscillator. The RF unit 13 may include Nt (where Nt is a positive integer) transmit antennas.

A signal processing process of the receiving device 20 is the reverse of the signal processing process of the transmitting device 10. Under the control of the processor 21, the RF unit 23 of the receiving device 10 receives radio signals transmitted by the transmitting device 10. The RF unit 23 may include Nr (where Nr is a positive integer) receive antennas and frequency down-converts each signal received through receive antennas into a baseband signal. The RF unit 23 may include an oscillator for frequency down-conversion. The processor 21 decodes and demodulates the radio signals received through the receive antennas and restores data that the transmitting device 10 originally desired to transmit.

The RF units 13 and 23 include one or more antennas. An antenna performs a function for transmitting signals processed by the RF units 13 and 23 to the exterior or receiving radio signals from the exterior to transfer the radio signals to the RF units 13 and 23. The antenna may also be called an antenna port. Each antenna may correspond to one physical antenna or may be configured by a combination of more than one physical antenna element. A signal transmitted through each antenna cannot be decomposed by the receiving device 20. A Reference Signal (RS) transmitted through an antenna defines the corresponding antenna viewed from the receiving device 20 and enables the receiving device 20 to perform channel estimation for the antenna, irrespective of whether a channel is a single radio channel from one physical antenna or a composite channel from a plurality of physical antenna elements including the antenna. That is, an antenna is defined such that a channel transmitting a symbol on the antenna may be derived from the channel transmitting another symbol on the same antenna. An RF unit supporting a MIMO function of transmitting and receiving data using a plurality of antennas may be connected to two or more antennas.

In the exemplary embodiments of the present invention, a UE or relay operates as the transmitting device 10 on uplink and as the receiving device 20 on downlink. In the exemplary embodiments of the present invention, a BS operates as the receiving device 20 on uplink and as the transmitting device 10 on downlink.

The detailed configuration(s) corresponding to the transmitting device and the receiving device, which are the BS or UE respectively, can be implemented by applying each of various embodiments independently or applying two or more embodiments simultaneously. Repetitional explanations are omitted for clarity of the embodiments.

The detailed description of the preferred embodiments of the present invention has been given to enable those skilled in the art to implement and practice the invention. Although the invention has been described with reference to the preferred embodiments, those skilled in the art will appreciate that various modifications and variations can be made in the present invention without departing from the spirit or scope of the invention described in the appended claims. Accordingly, the invention should not be limited to the specific embodiments described herein, but should be accorded the broadest scope consistent with the principles and novel features disclosed herein.

INDUSTRIAL APPLICABILITY

The embodiments of the present invention may be used for a base station, a user equipment or other equipment in a wireless communication system.

The invention claimed is:

1. A method for receiving a downlink signal from a base station (BS) in a multicast broadcast single frequency network (MBSFN) subframe, the method performed by a user equipment (UE) and comprising:
receiving information indicating:
an MBSFN subframe, of which a data region is allocated for a cell-specific reference signal (CRS), among plural MBSFN subframes, and
a frequency resource region in which the indicated MBSFN subframe is configured for the UE; and
demodulating the downlink signal received in the data region of the indicated MBSFN subframe based on the CRS received in a part of the data region of the indicated MBSFN subframe and a UE-specific reference signal received in a remaining part of the data region of the indicated MBSFN subframe, according to the received information.

2. The method according to claim 1, further comprising receiving at least one of resource configuration information and transmission power information of the CRS transmitted in the data region of the indicated MBSFN subframe.

3. The method according to claim 1, wherein the CRS allocated in the data region of the indicated MBSFN subframe is transmitted at a reduced transmission power compared with a transmission power of a normal CRS.

4. The method according to claim 1, wherein the indicated MBSFN subframes are configured as almost blank subframes (ABSs) of which a data region is allocated a reduced transmission power lower than a transmission power in a data region of a normal subframe.

5. The method according to claim 1, wherein the information indicating the MBSFN subframe is received from the BS through higher layer signaling.

6. A method for transmitting a downlink signal to a user equipment (UE) in a multicast broadcast single frequency network (MBSFN) subframe, the method performed by a base station (BS) and comprising:
transmitting, to the UE, information indicating:
an MBSFN subframe of which a data region is allocated for a cell-specific reference signal (CRS), among plural MBSFN subframes, and
a frequency resource region in which the indicated MBSFN subframe is configured for the UE;
wherein the information indicates that the UE is to demodulate the downlink signal received in the data region of the indicated MBSFN subframe, based on the CRS received in a part of the data region of the indicated MBSFN subframe and a UE-specific reference signal received in a remaining part of the data region of the indicated MBSFN subframe.

7. A user equipment (UE) for receiving a downlink signal from a base station (BS) in a multicast broadcast single frequency network (MBSFN) subframe, comprising:
a radio frequency (RF) unit for transmitting or receiving an RF signal; and
a processor for controlling the RF unit,
wherein the processor
receives, through the RF unit, information indicating:
an MBSFN subframe, of which a data region is allocated for a cell-specific reference signal (CRS), among plural MBSFN subframes, and
a frequency resource region in which the indicated MBSFN subframe is configured for the UE, and
demodulates the downlink signal received in the data region of the indicated MBSFN subframe based on the CRS received in a part of the data region of the indicated MBSFN subframe and a UE-specific reference signal received in a remaining part of the data region of the indicated MBSFN subframe, according to the received information.

8. The UE according to claim 7, wherein the processor receives at least one of resource configuration information and transmission power information of the CRS transmitted in the data region of the indicated MBSFN subframe through the RF unit.

9. The UE according to claim 7, wherein the CRS allocated in the data region of the indicated MBSFN subframe is transmitted at a reduced transmission power compared with a transmission power of a normal CRS.

10. The UE according to claim 7, wherein the indicated MBSFN subframes are configured as almost blank subframes (ABSs) of which a data region is allocated a reduced transmission power lower than a transmission power in a data region of a normal subframe.

11. The UE according to claim 7, wherein the information indicating the MBSFN subframe is received from the BS through higher layer signaling.

12. A base station (BS) for transmitting a downlink signal to a user equipment (UE) in a multicast broadcast single frequency network (MBSFN) subframe, comprising:
a radio frequency (RF) unit for transmitting or receiving an RF signal; and
a processor for controlling the RF unit,
wherein the processor transmits, through the RF unit to the UE, information indicating:
an MBSFN subframe, of which a data region is allocated for a cell-specific reference signal (CRS), among plural MBSFN subframes, and
a frequency resource region in which the indicated MBSFN subframe is configured for the UE, and
wherein the information indicates that the UE is to demodulate the downlink signal received in the data region of the indicated MBSFN subframe, based on the CRS in a part of the data region of the indicated MBSFN subframe and a UE-specific reference signal received in a remaining part of the data region of the indicated MBSFN subframe.

* * * * *